United States Patent
Hirokawa et al.

(10) Patent No.: US 12,518,420 B2
(45) Date of Patent: Jan. 6, 2026

(54) IMAGE PROCESSING METHOD, IMAGE PROCESSING DEVICE, AND PROGRAM FOR VORTEX VEIN DETECTION IN FUNDUS IMAGES

(71) Applicant: NIKON CORPORATION, Tokyo (JP)

(72) Inventors: Mariko Hirokawa, Yokohama (JP); Yasushi Tanabe, Fujisawa (JP)

(73) Assignee: NIKON CORPORATION, Tokyo (JP)

( * ) Notice: Subject to any disclaimer, the term of this patent is extended or adjusted under 35 U.S.C. 154(b) by 613 days.

(21) Appl. No.: 17/769,318

(22) PCT Filed: Oct. 15, 2019

(86) PCT No.: PCT/JP2019/040483
§ 371 (c)(1),
(2) Date: Aug. 30, 2022

(87) PCT Pub. No.: WO2021/074962
PCT Pub. Date: Apr. 22, 2021

(65) Prior Publication Data
US 2024/0127473 A1  Apr. 18, 2024

(51) Int. Cl.
*G06T 7/73* (2017.01)
*G06T 7/00* (2017.01)
(Continued)

(52) U.S. Cl.
CPC .............. *G06T 7/74* (2017.01); *G06T 7/0016* (2013.01); *G16H 30/40* (2018.01); *G16H 50/50* (2018.01);
(Continued)

(58) Field of Classification Search
CPC ................. G06T 7/74; G06T 7/0016; G06T 2207/10024; G06T 2207/10101; G06T 2207/30041; G06T 2207/30101; G16H 30/40; G16H 50/50; G16H 30/20; A61B 3/12
See application file for complete search history.

(56) References Cited

U.S. PATENT DOCUMENTS

| | | | |
|---|---|---|---|
| 10,383,511 B2 * | 8/2019 | Iwase | G06T 7/0012 |
| 2014/0118690 A1 | 5/2014 | Sato et al. | |

(Continued)

FOREIGN PATENT DOCUMENTS

| | | | |
|---|---|---|---|
| JP | 2008-029732 A | 2/2008 | |
| JP | 2014-083285 A | 5/2014 | |

(Continued)

OTHER PUBLICATIONS

Ohno-Matsui Kyoko et al., "The long-term follow-up of a highly myopic patient with a macular vortex vein", Acta Ophthalmologica Scandinavica, Jun. 30, 1997, vol. 75, No. 3, pp. 329-332, 4 pages. (Year: 1997).*

(Continued)

*Primary Examiner* — Amandeep Saini
*Assistant Examiner* — Emma Rose Goebel
(74) *Attorney, Agent, or Firm* — Foley & Lardner LLP

(57) ABSTRACT

A processor identifies a first position of a vortex vein from a first fundus image, identifies a second position of the vortex vein from a second fundus image, and generates data of a screen to display the first position and the second position.

9 Claims, 16 Drawing Sheets

(51) Int. Cl.
  *G16H 30/40* (2018.01)
  *G16H 50/50* (2018.01)
(52) U.S. Cl.
  CPC ............... *G06T 2207/10024* (2013.01); *G06T 2207/10101* (2013.01); *G06T 2207/30041* (2013.01); *G06T 2207/30101* (2013.01)

(56) References Cited

U.S. PATENT DOCUMENTS

2020/0394789 A1* 12/2020 Freund .................. G06T 7/0012
2021/0004939 A1    1/2021 Hirokawa

FOREIGN PATENT DOCUMENTS

JP      2018161230 A  * 10/2018
WO   WO-2019/181981 A1   9/2019

OTHER PUBLICATIONS

Office Action issued in corresponding Japanese Patent Application No. 2021-552011 dated May 23, 2023 (7 pages).
Moriyama Muka et al., "Detection of posterior vortex veins in eyes with pathologic myopia by ultra-widefield indocyanine green angiography", British Journal of Ophthalmology, Sep. 18, 2017, vol. 101, Issue 9, pp. 1179-1184, 8 pages.
Ohno-Matsui Kyoko et al., "The long-term follow-up of a highly myopic patient with a macular vortex vein", Acta Ophthalmologica Scandinavica, Jun. 30, 1997, vol. 75, No. 3, pp. 329-332, 4 pages.

* cited by examiner

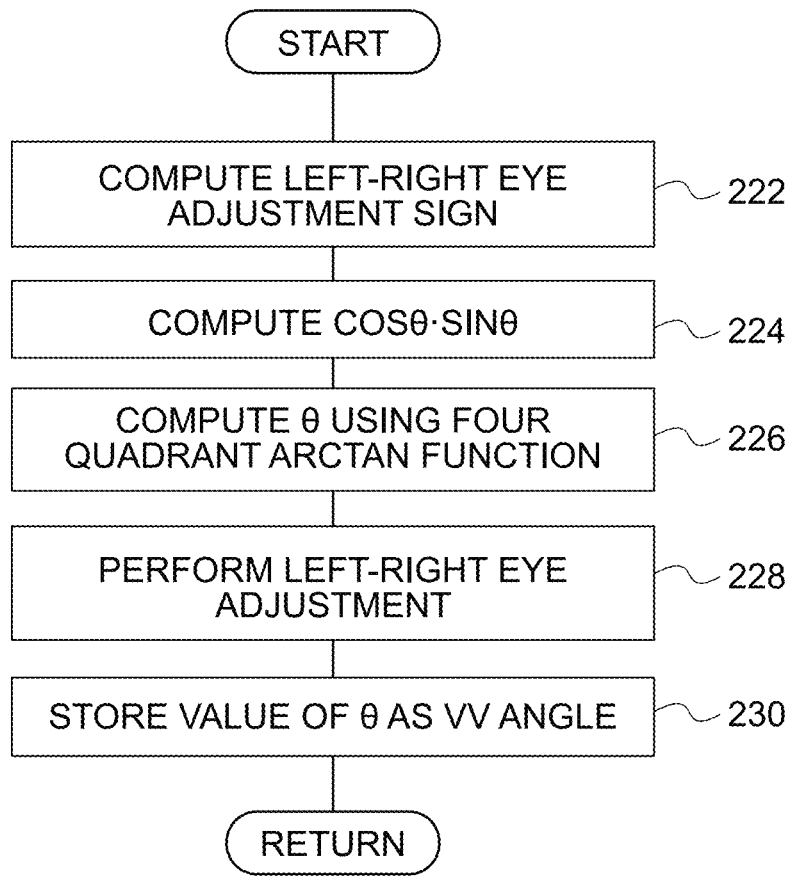
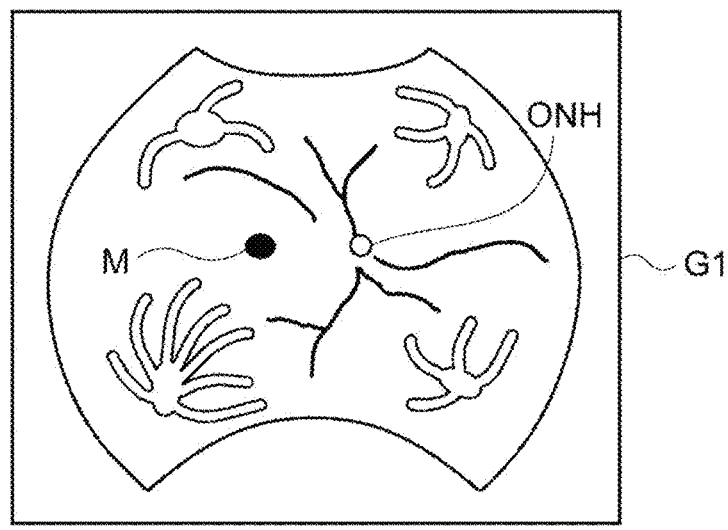

IMAGE PROCESSING METHOD, IMAGE PROCESSING DEVICE, AND PROGRAM FOR VORTEX VEIN DETECTION IN FUNDUS IMAGES

The technology disclosed herein relates to an image processing method, an image processing device, and a program.

BACKGROUND ART

The specification of U.S. Pat. No. 8,636,364 discloses identifying positions of vortex veins from a fundus image.

There is a desire for follow-up observations of vortex vein positions.

SUMMARY OF INVENTION

An image processing method of a first aspect of technology disclosed herein including a processor identifying a first position of a vortex vein from a first fundus image, the processor identifying a second position of the vortex vein from a second fundus image, and the processor generating data of a vortex vein map to display the first position and the second position.

An image processing device of a second aspect of technology disclosed herein including, a memory; and a processor coupled to the memory, wherein the processor, identifies a first position of a vortex vein from a first fundus image, identifies a second position of the vortex vein from a second fundus image; and generates data of a vortex vein map to display the first position and the second position.

A program of a third aspect of technology disclosed herein causes a computer to execute processing including, identifying a first position of a vortex vein from a first fundus image, identifying a second position of the vortex vein from a second fundus image; and generating data of a vortex vein map to display the first position and the second position.

BRIEF DESCRIPTION OF DRAWINGS

FIG. 7B is a flowchart of processing to compute an angle θ in relative position computation processing of vortex veins of step 506 of FIG. 5.

FIG. 8 is an image illustrating a RGB color fundus image G1.

DESCRIPTION OF EMBODIMENTS

Detailed explanation follows regarding an exemplary embodiment of the technology disclosed herein, with reference to the drawings.

Figure 1:
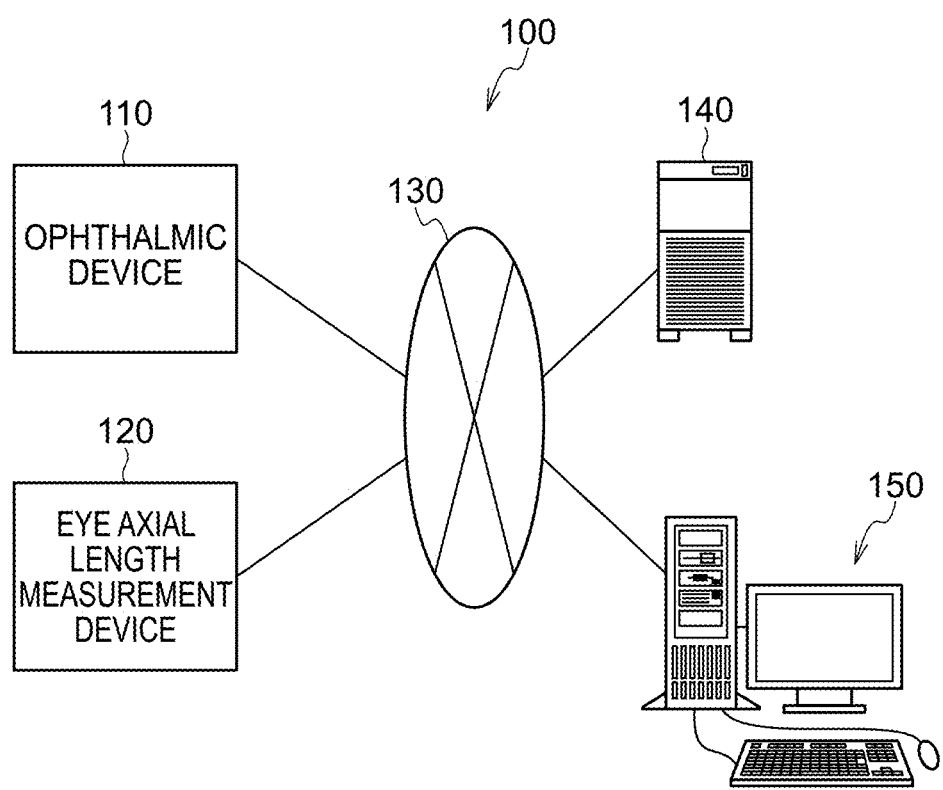
FIG. 1 is a block diagram of an ophthalmic system 100.

Explanation follows regarding a configuration of an ophthalmic system 100, with reference to FIG. 1. As illustrated in FIG. 1, the ophthalmic system 100 includes an ophthalmic device 110, an eye axial length measurement device 120, a management server device (referred to hereafter as "server") 140, and an image display device (referred to hereafter as "viewer") 150. The ophthalmic device 110 acquires an image of the fundus. The eye axial length measurement device 120 measures the axial length of the eye of a patient. The server 140 stores fundus images that were obtained by imaging the fundus of patients using the ophthalmic device 110 in association with patient IDs. The viewer 150 displays medical information such as fundus images acquired from the server 140.

The ophthalmic device 110, the eye axial length measurement device 120, the server 140, and the viewer 150 are connected together through a network 130.

Figure 2:
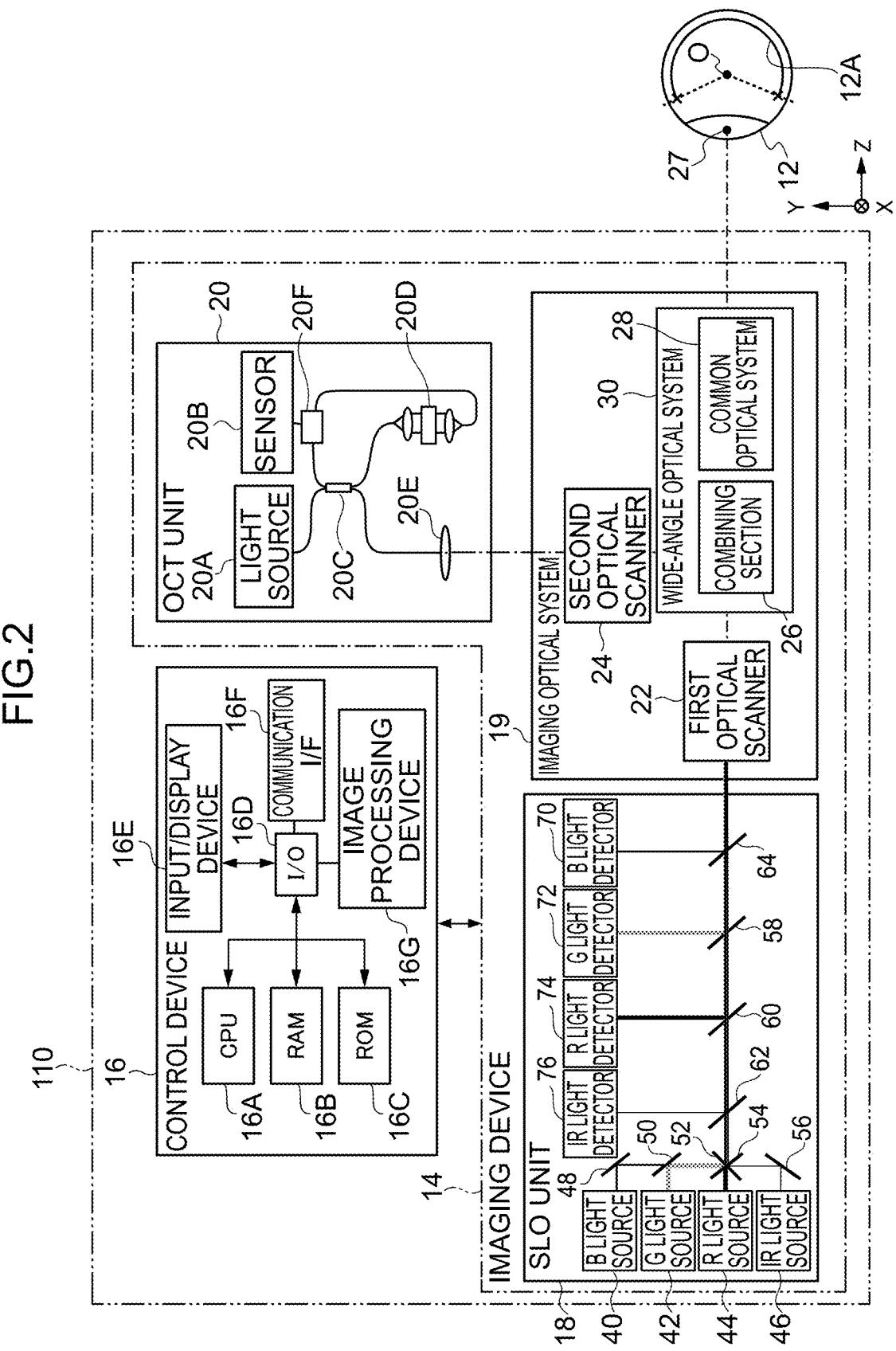
FIG. 2 is a schematic configuration diagram illustrating an overall configuration of an ophthalmic device 110.

Next, explanation follows regarding a configuration of the ophthalmic device 110, with reference to FIG. 2.

For ease of explanation, scanning laser ophthalmoscope is abbreviated to SLO. Optical coherence tomography is also abbreviated to OCT.

With the ophthalmic device 110 installed on a horizontal plane and a horizontal direction taken as an X direction, a direction perpendicular to the horizontal plane is denoted a Y direction, and a direction connecting the center of the pupil at the anterior eye portion of the examined eye 12 and the center of the eyeball is denoted a Z direction. The X direction, the Y direction, and the Z direction are thus mutually perpendicular directions.

The ophthalmic device 110 includes an imaging device 14 and a control device 16. The imaging device 14 is provided with an SLO unit 18, an OCT unit 20, and an imaging optical system 19, and acquires a fundus image of the fundus of the examined eye 12. Two-dimensional fundus images that have been acquired by the SLO unit 18 are referred to hereafter as SLO images. Tomographic images, face-on images (en-face images) and the like of the retina created based on OCT data acquired by the OCT unit 20 are referred to hereafter as OCT images.

The control device 16 includes a computer provided with a Central Processing Unit (CPU) 16A, Random Access Memory (RAM) 16B, Read-Only Memory (ROM) 16C, and an input/output (I/O) port 16D.

The control device 16 is provided with an input/display device 16E connected to the CPU 16A through the I/O port 16D. The input/display device 16E includes a graphical user interface to display images of the examined eye 12 and to receive various instructions from a user. An example of the graphical user interface is a touch panel display.

The control device 16 is provided with an image processing device 16G connected to the I/O port 16D. The image processing device 16G generates images of the examined eye 12 based on data acquired by the imaging device 14. The control device 16 is provided with a communication interface (I/F) 16F connected to the I/O port 16D. The ophthalmic device 110 is connected to the eye axial length measurement device 120, the server 140, and the viewer 150 through the communication interface (I/F) 16F and the network 130.

Although the control device 16 of the ophthalmic device 110 is provided with the input/display device 16E as illustrated in FIG. 2, the technology disclosed herein is not limited thereto. For example, a configuration may adopted in which the control device 16 of the ophthalmic device 110 is not provided with the input/display device 16E, and instead a separate input/display device is provided that is physically independent of the ophthalmic device 110. In such cases, the display device is provided with an image processing processor unit that operates under the control of the CPU 16A in the control device 16. Such an image processing processor unit may display SLO images and the like based on an image signal output as an instruction by the CPU 16A.

The imaging device 14 operates under the control of the CPU 16A of the control device 16. The imaging device 14 includes the SLO unit 18, an imaging optical system 19, and the OCT unit 20. The imaging optical system 19 includes a first optical scanner 22, a second optical scanner 24, and a wide-angle optical system 30.

The first optical scanner 22 scans light emitted from the SLO unit 18 two dimensionally in the X direction and the Y direction. The second optical scanner 24 scans light emitted from the OCT unit 20 two dimensionally in the X direction and the Y direction. As long as the first optical scanner 22 and the second optical scanner 24 are optical elements capable of deflecting light beams, they may be configured by any out of, for example, polygon mirrors, mirror galvanometers, or the like. A combination thereof may also be employed.

The wide-angle optical system 30 includes an objective optical system (not illustrated in FIG. 2) provided with a common optical system 28, and a combining section 26 that combines light from the SLO unit 18 with light from the OCT unit 20.

The objective optical system of the common optical system 28 may be a reflection optical system employing a concave mirror such as an elliptical mirror, a refraction optical system employing a wide-angle lens, or may be a reflection-refraction optical system employing a combination of a concave mirror and a lens. Employing a wide-angle optical system that utilizes an elliptical mirror, wide-angle lens, or the like enables imaging to be performed not only of a central portion of the fundus where the optic nerve head and macular are present, but also of the retina at the periphery of the fundus where an equatorial portion of the eyeball and vortex veins are present.

For a system including an elliptical mirror, a configuration may be adopted that utilizes an elliptical mirror system as disclosed in International Publication (WO) Nos. 2016/103484 or 2016/103489. The disclosures of WO Nos. 2016/103484 and 2016/103489 are incorporated in their entirety by reference herein.

Observation of the fundus over a wide field of view (FOV) 12A is implemented by employing the wide-angle optical system 30. The FOV 12A refers to a range capable of being imaged by the imaging device 14. The FOV 12A may be expressed as a viewing angle. In the present exemplary embodiment the viewing angle may be defined in terms of an internal illumination angle and an external illumination angle. The external illumination angle is the angle of illumination by a light beam shone from the ophthalmic device 110 toward the examined eye 12, and is an angle of illumination defined with respect to a pupil 27. The internal illumination angle is the angle of illumination of a light beam shone onto the fundus, and is an angle of illumination defined with respect to an eyeball center O. A correspondence relationship exists between the external illumination angle and the internal illumination angle. For example, an external illumination angle of 120° is equivalent to an internal illumination angle of approximately 160°. The internal illumination angle in the present exemplary embodiment is 200°.

An angle of 200° for the internal illumination angle is an example of a "specific value" of technology disclosed herein.

SLO fundus images obtained by imaging at an imaging angle having an internal illumination angle of 160° or greater are referred to as UWF-SLO fundus images. UWF is an abbreviation of ultra-wide field. Obviously an SLO image that is not UWF can be acquired by imaging the fundus at an imaging angle that is an internal illumination angle of less than 160°.

An SLO system is realized by the control device 16, the SLO unit 18, and the imaging optical system 19 as illustrated in FIG. 2. The SLO system is provided with the wide-angle optical system 30, enabling fundus imaging over the wide FOV 12A.

The SLO unit 18 is provided with plural light sources such as, for example, a blue (B) light source 40, a green (G) light source 42, a red (R) light source 44, an infrared (for example near infrared) (IR) light source 46, and optical systems 48, 50, 52, 54, 56 to guide the light from the light sources 40, 42, 44, 46 onto a single optical path using reflection or transmission. The optical systems 48, 50, 56 are configured by mirrors, and the optical systems 52, 54 are configured by beam splitters. B light is reflected by the optical system 48, is transmitted through the optical system 50, and is reflected by the optical system 54. G light is reflected by the optical systems 50, 54, R light is transmitted through the optical systems 52, 54, and IR light is reflected by the optical systems 56, 52. The respective lights are thereby guided onto a single optical path.

The SLO unit 18 is configured so as to be capable of switching between the light source or the combination of light sources employed for emitting laser light of different wavelengths, such as a mode in which G light, R light and B light are emitted, a mode in which infrared light is emitted, etc. Although the example in FIG. 2 includes four light sources, i.e. the B light source 40, the G light source 42, the R light source 44, and the IR light source 46, the technology disclosed herein is not limited thereto. For example, the SLO unit 18 may, furthermore, also include a white light source, in a configuration in which light is emitted in various modes, such as a mode in which white light is emitted alone.

Light introduced to the imaging optical system 19 from the SLO unit 18 is scanned in the X direction and the Y direction by the first optical scanner 22. The scanning light passes through the wide-angle optical system 30 and the pupil 27 and is shone onto the posterior eye portion of the examined eye 12. Reflected light that has been reflected by the fundus passes through the wide-angle optical system 30 and the first optical scanner 22 and is introduced into the SLO unit 18.

The SLO unit 18 is provided with a beam splitter 64 that, from out of the light coming from the posterior eye portion (e.g. fundus) of the examined eye 12, reflects the B light therein and transmits light other than B light therein, and a beam splitter 58 that, from out of the light transmitted by the beam splitter 64, reflects the G light therein and transmits light other than G light therein. The SLO unit 18 is further provided with a beam splitter 60 that, from out of the light transmitted through the beam splitter 58, reflects R light therein and transmits light other than R light therein. The SLO unit 18 is further provided with a beam splitter 62 that reflects IR light from out of the light transmitted through the beam splitter 60.

The SLO unit 18 is provided with plural light detectors corresponding to the plural light sources. The SLO unit 18 includes a B light detector 70 for detecting B light reflected by the beam splitter 64, and a G light detector 72 for detecting G light reflected by the beam splitter 58. The SLO unit 18 includes an R light detector 74 for detecting R light reflected by the beam splitter 60 and an IR light detector 76 for detecting IR light reflected by the beam splitter 62.

Light that has passed through the wide-angle optical system 30 and the first optical scanner 22 and been introduced into the SLO unit 18 (i.e. reflected light that has been reflected by the fundus) is reflected by the beam splitter 64 and photo-detected by the B light detector 70 when B light, and is transmitted through the beam splitter 64 and reflected by the beam splitter 58 and photo-detected by the G light detector 72 when G light. When R light, the incident light is transmitted through the beam splitters 64, 58, reflected by the beam splitter 60, and photo-detected by the R light detector 74. When IR light, the incident light is transmitted through the beam splitters 64, 58, 60, reflected by the beam splitter 62, and photo-detected by the IR light detector 76. The image processing device 16G that operates under the control of the CPU 16A employs signals detected by the B light detector 70, the G light detector 72, the R light detector 74, and the IR light detector 76 to generate UWF-SLO images.

The UWF-SLO image (also sometimes referred to as a UWF fundus image or an original fundus image as described below) encompasses a UWF-SLO image (green fundus image) obtained by imaging the fundus in green, and a UWF-SLO image (red fundus image) obtained by imaging the fundus in red. The UWF-SLO image further encompasses a UWF-SLO image (blue fundus image) obtained by imaging the fundus in blue, and a UWF-SLO image (IR fundus image) obtained by imaging the fundus in IR.

The control device 16 also controls the light sources 40, 42, 44 so as to emit light at the same time. A green fundus image, a red fundus image, and a blue fundus image are obtained with mutually corresponding positions by imaging the fundus of the examined eye 12 at the same time with the B light, G light, and R light. An RGB color fundus image is obtained from the green fundus image, the red fundus image, and the blue fundus image. The control device 16 obtains a green fundus image and a red fundus image with mutually corresponding positions by controlling the light sources 42, 44 so as to emit light at the same time and to image the fundus of the examined eye 12 at the same time with the G light and R light. A RG color fundus image is obtained from the green fundus image and the red fundus image.

Specific examples of the UWF-SLO image include a blue fundus image, a green fundus image, a red fundus image, an IR fundus image, an RGB color fundus image, and an RG color fundus image. The image data for the respective UWF-SLO images are transmitted from the ophthalmic device 110 to the server 140 through the communication interface (I/F) 16F, together with patient information input through the input/display device 16E. The respective image data of the UWF-SLO image and the patient information is stored associated with each other in the storage device 254. The patient information includes, for example, patient ID, name, age, visual acuity, right eye/left eye discriminator, and the like. The patient information is input by an operator through the input/display device 16E.

An OCT system is realized by the control device 16, the OCT unit 20, and the imaging optical system 19 illustrated in FIG. 2. The OCT system is provided with the wide-angle optical system 30. This enables fundus imaging to be performed over the wide FOV 12A similarly to when imaging the SLO fundus images as described above. The OCT unit 20 includes a light source 20A, a sensor (detector) 20B, a first light coupler 20C, a reference optical system 20D, a collimator lens 20E, and a second light coupler 20F.

Light emitted from the light source 20A is split by the first light coupler 20C. After one part of the split light has been collimated by the collimator lens 20E into parallel light, to serve as measurement light, the parallel light is introduced into the imaging optical system 19. The measurement light is scanned in the X direction and the Y direction by the second optical scanner 24. The scanning light is shone onto the fundus through the wide-angle optical system 30 and the pupil 27. Measurement light that has been reflected by the fundus passes through the wide-angle optical system 30 and the second optical scanner 24 so as to be introduced into the OCT unit 20. The measurement light then passes through the collimator lens 20E and the first light coupler 20C before being incident to the second light coupler 20F.

The other part of the light emitted from the light source 20A and split by the first light coupler 20C is introduced into the reference optical system 20D as reference light, and is made incident to the second light coupler 20F through the reference optical system 20D.

The respective lights that are incident to the second light coupler 20F, namely the measurement light reflected by the fundus and the reference light, interfere with each other in the second light coupler 20F so as to generate interference light. The interference light is photo-detected by the sensor 20B. The image processing device 16G operating under the control of the CPU 16A generates OCT images, such as tomographic images and en-face images, based on OCT data detected by the sensor 20B.

OCT fundus images obtained by imaging at an imaging angle having an internal illumination angle of 160° or greater are referred to as UWF-OCT images. Obviously OCT fundus image data can be acquired at an imaging angle having an internal illumination angle of less than 160°.

The image data of the UWF-OCT images is transmitted, together with the patient information, from the ophthalmic device 110 to the server 140 though the communication interface (I/F) 16F. The image data of the UWF-OCT images and the patient information are stored associated with each other in the storage device 254.

Note that although in the present exemplary embodiment an example is given in which the light source 20A is a swept-source OCT (SS-OCT), the light source 20A may be configured from various types of OCT system, such as a spectral-domain OCT (SD-OCT) or a time-domain OCT (TD-OCT) system.

Next, explanation follows regarding the eye axial length measurement device 120. The eye axial length measurement device 120 has two modes, i.e. a first mode and a second mode, for measuring eye axial length, this being the length of an examined eye 12 in an eye axial direction. In the first mode light from a non-illustrated light source is guided into the examined eye 12. Interference light between light reflected from the fundus and light reflected from the cornea is photo-detected, and the eye axial length is measured based on an interference signal representing the photo-detected interference light. The second mode is a mode to measure the eye axial length by employing non-illustrated ultrasound waves.

The eye axial length measurement device 120 transmits the eye axial length as measured using either the first mode or the second mode to the server 140. The eye axial length may be measured using both the first mode and the second mode, and in such cases, an average of the eye axial lengths as measured using the two modes is transmitted to the server 140 as the eye axial length. The server 140 stores the eye axial length of the patients in association with the patient ID.

Figure 3:
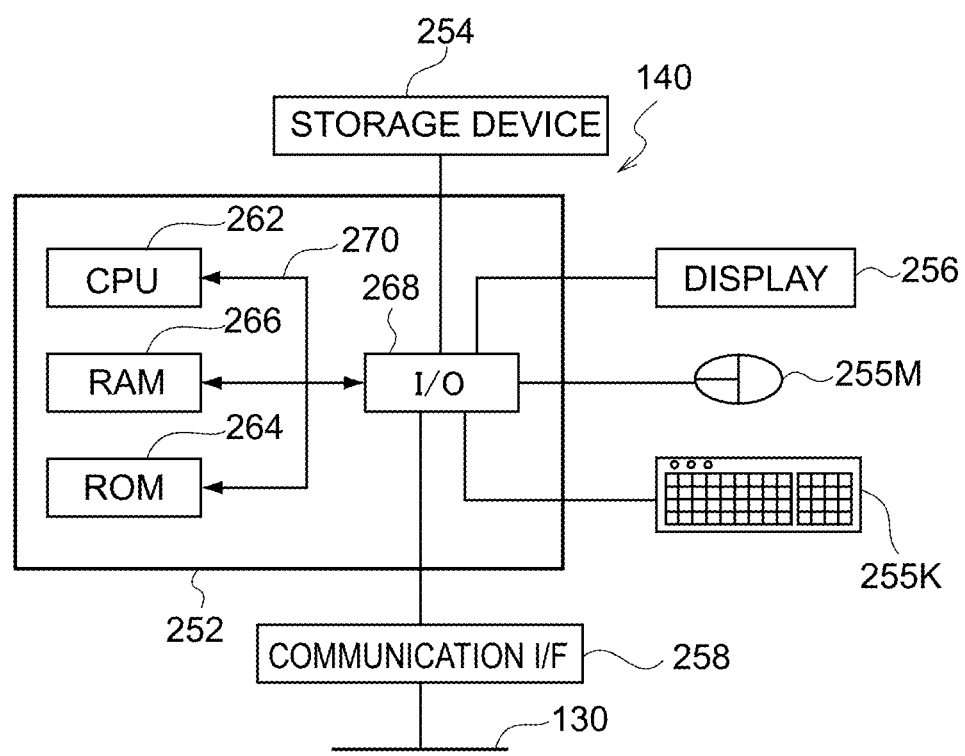
FIG. 3 is a block diagram of configuration of an electrical system of a server 140.

Explanation follows regarding a configuration of an electrical system of the server 140, with reference to FIG. 3. As illustrated in FIG. 3, the server 140 is provided with a computer body 252. The computer body 252 includes a CPU 262, RAM 266, ROM 264, and an input/output (I/O) port 268 connected together by a bus 270. The storage device 254, a display 256, a mouse 255M, a keyboard 255K, and a communication interface (I/F) 258 are connected to the input/output (I/O) port 268. The storage device 254 is, for example, configured by non-volatile memory. The input/output (I/O) port 268 is connected to the network 130 through the communication interface (I/F) 258. The server 140 is thus capable of communicating with the ophthalmic device 110 and the viewer 150. The storage device 254 is stored with an image processing program, described later. Note that the image processing program may be stored in the ROM 264.

The image processing program is an example of a "program" of technology disclosed herein. The storage device 254 and the ROM 264 are examples of "memory" and "computer readable storage medium" of technology disclosed herein. The CPU 262 is an example of a "processor" of technology disclosed herein.

A processing section 208, described later (see also FIG. 4) of the server 140 stores various data received from the ophthalmic device 110 in the storage device 254. More specifically, the processing section 208 stores respective image data of the UWF-SLO images and image data of the UWF-OCT images in the storage device 254 associated with the patient information (such as the patient ID as described above). Moreover, in cases in which there is a pathological change in the examined eye of the patient and cases in which surgery has been performed to a pathological lesion, pathology information is input through the input/display device 16E of the ophthalmic device 110 and transmitted to the server 140. The pathology information is stored in the storage device 254 associated with the patient information. The pathology information includes information about the position of the pathological lesion, name of the pathological change, and name of the surgeon and date/time of surgery etc. when surgery was performed on the pathological lesion.

The viewer 150 is provided with a computer equipped with a CPU, RAM, ROM and the like, and a display. The image processing program is installed in the ROM, and based on an instruction from a user the computer controls the display so as to display the medical information such as fundus images acquired from the server 140.

Figure 4:
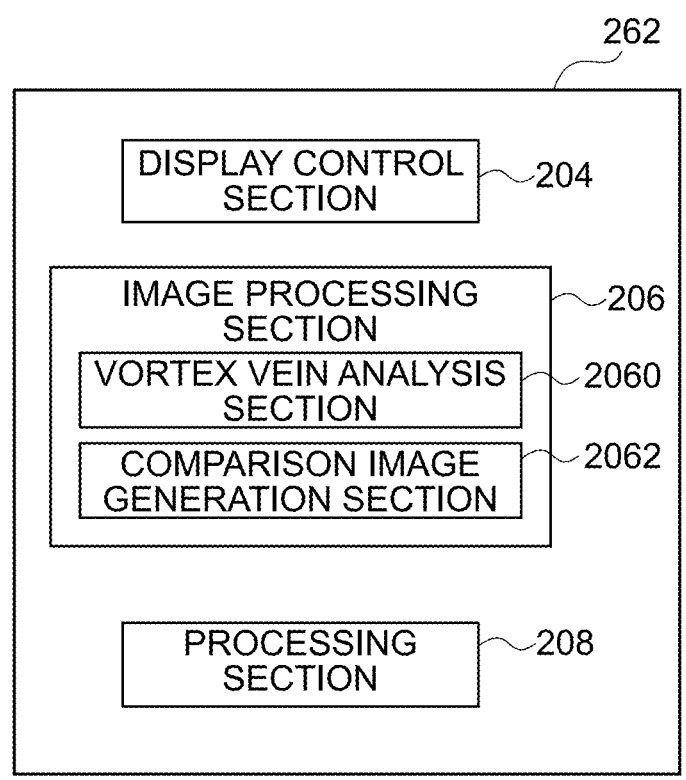
FIG. 4 is a block diagram illustrating functionality of a CPU 262 of a server 140.

Next, description follows regarding various functions implemented by the CPU 262 of the server 140 executing the image processing program, with reference to FIG. 4. The image processing program includes a display control function, an image processing function (vortex vein analysis function, comparison image generation function), and processing function. By the CPU 262 executing the image processing program including each of these functions, the CPU 262 functions as a display control section 204, an image processing section 206 (vortex vein analysis section 2060 and comparison image generation section 2062), and the processing section 208, as illustrated in FIG. 4.

Figure 5:
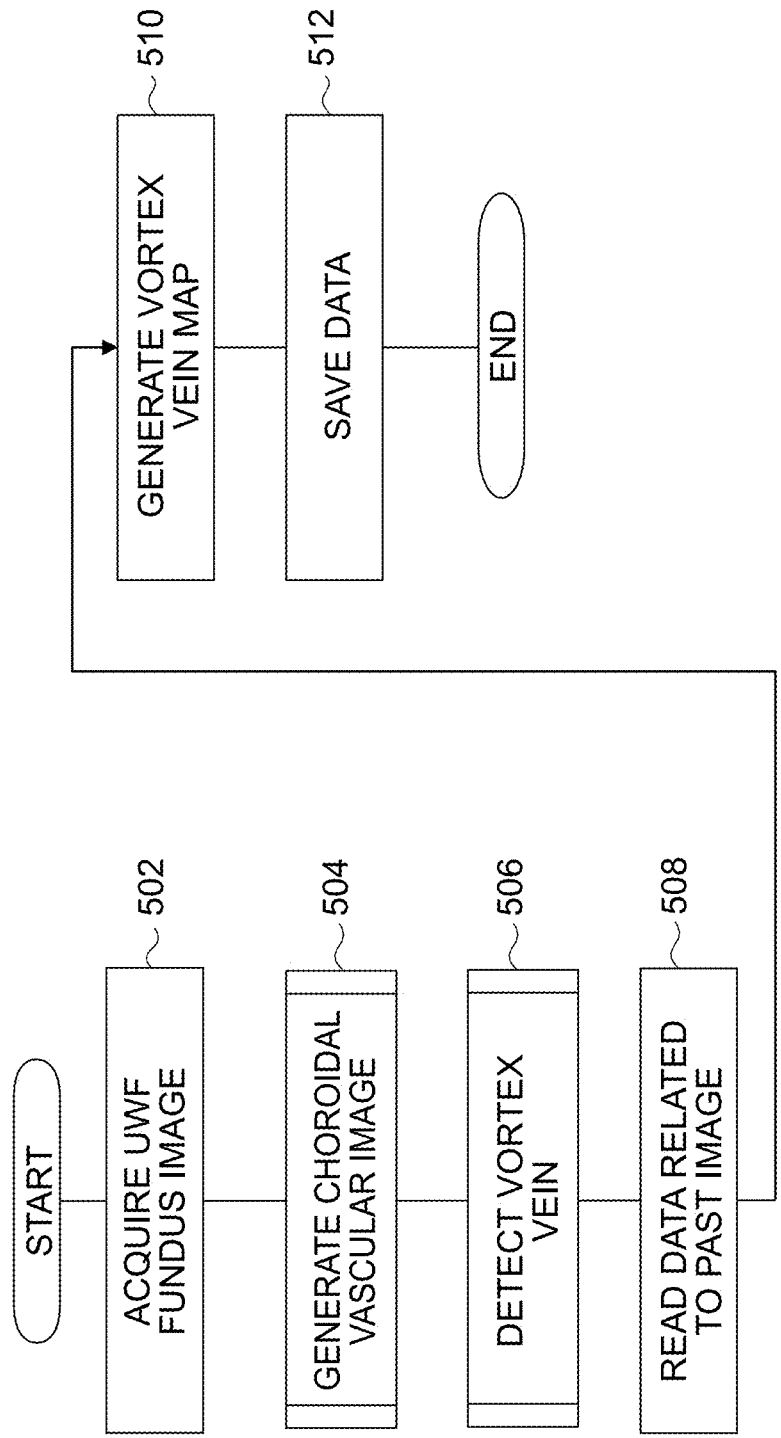
FIG. 5 is a flowchart of an image processing by the server 140.

Next detailed description follows regarding image processing by the server 140, with reference to FIG. 5. The image processing illustrated in the flowchart of FIG. 5 is implemented by the CPU 262 of the server 140 executing the image processing program. This image processing is started when a UWF fundus image (UWF-SLO image) is acquired by the ophthalmic device 110 and transmitted together with the patient ID to the server 140, and the server 140 has received the patient ID and the UWF fundus image.

At step 502, the processing section 208 acquires the UWF fundus image G1 (note that a RGB color fundus image is illustrated in FIG. 8) from the storage device 254.

At step 504, the processing section 208 generates a choroidal vascular image in the following manner.

First explanation follows regarding information contained in the red fundus image and the green fundus image from out of UWF fundus images.

The structure of an eye is one in which a vitreous body is covered by plural layers of differing structure. The plural layers include, from the vitreous body at the extreme inside to the outside, the retina, the choroid, and the sclera. R light passes through the retina and reaches the choroid. The red fundus image therefore includes information relating to blood vessels present within the retina (retinal blood vessels) and information relating to blood vessels present within the choroid (choroidal blood vessels). In contrast thereto, G light only reaches as far as the retina. The green fundus image accordingly only includes information relating to the blood vessels present within the retina (retinal blood vessels).

Figure 9:
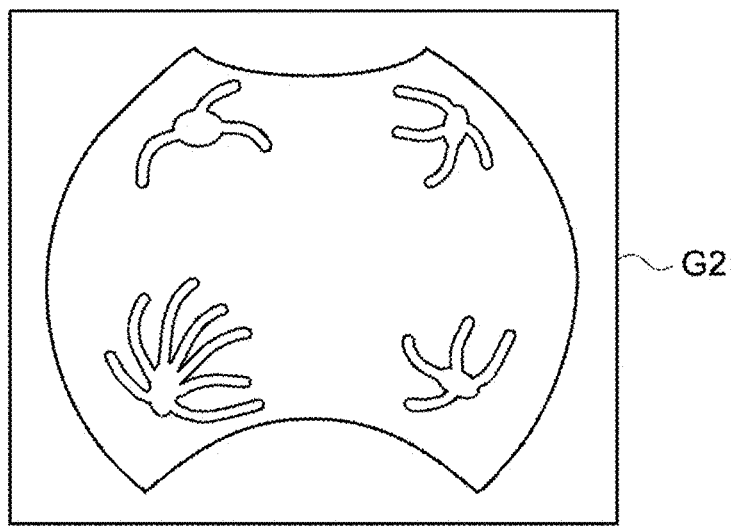
FIG. 9 is an image illustrating a choroidal vascular image G2.

The processing section 208 extracts the retinal blood vessels from the green fundus image by applying black hat filter processing to the green fundus image. Next, the processing section 208 removes the retinal blood vessels from the red fundus image by performing in-painting processing thereon using the retinal blood vessels extracted from the green fundus image. Namely, position information for the retinal blood vessels extracted from the green fundus image is employed when performing processing to infill the retinal blood vessel structure in the red fundus image using pixel values the same as those of surrounding pixels. The processing section 208 then emphasizes the choroidal blood vessels in the red fundus image by performing contrast limited adaptive histogram equalization (CLAHE) processing on the image data of the red fundus image from which the retinal blood vessels have been removed. The choroidal vascular image G2 illustrated in FIG. 9 was obtained in this manner. The generated choroidal vascular image is stored in the storage device 254.

The generation of the choroidal vascular image from the red fundus image and the green fundus image may be performed by the processing section 208 generating a choroidal vascular image using the red fundus image red fundus image or IR fundus image imaged with IR light.

A method to generate choroidal fundus images is disclosed in Japanese Patent Application No. 2018-052246 filed Mar. 20, 2018, the entirety of which is incorporated in the present specific by reference herein.

At step 506 the vortex vein analysis section 2060 analyzes the choroidal vascular image, and detects positions of a vortex vein. Then the vortex vein analysis section 2060 analyzes a positional relationship of the vortex vein position and a fundus structure such as the macular and optic nerve head.

Figure 6:
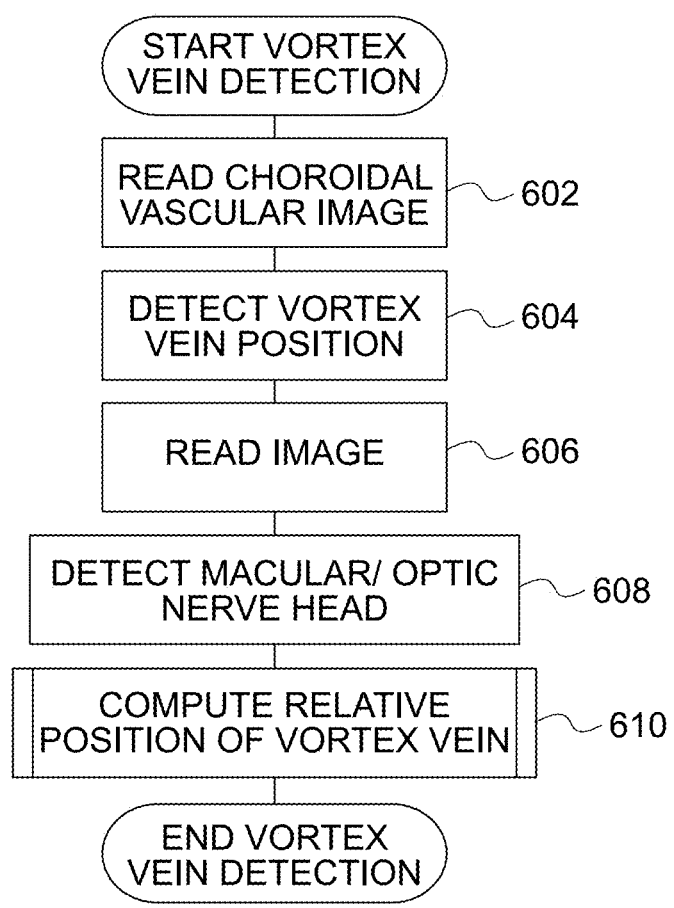
FIG. 6 is a flowchart of step 506 of FIG. 5.

Explanation follows regarding vortex vein detection processing of step 506, with reference to FIG. 6.

At step 602 the vortex vein analysis section 2060 reads a choroidal vascular image from the storage device 254.

At step 604 the vortex vein analysis section 2060 detects the vortex vein positions in the following manner.

Vortex veins are flow paths of blood flow flowing into the choroid, and there are from four to six vortex veins present toward the posterior pole of an equatorial portion of the eyeball. The vortex vein positions are computed based on the running direction of the choroidal blood vessels. This is a computation method based on the fact that moving along a choroidal blood vessel must inevitably be connected to a vortex vein flow path. Moving along the running direction of the blood vessels from the choroidal vascular image results in a position where plural blood vessels merge, and this is taken as a position of a vortex vein.

The vortex vein analysis section 2060 sets a movement direction of each of the choroidal blood vessels (blood vessel running direction) in the choroidal vascular image G2. More specifically, first the vortex vein analysis section 2060 executes the following processing on each pixel in the choroidal vascular image. Namely, for each pixel the vortex vein analysis section 2060 sets an area (cell) having the respective pixel at the center, and creates a histogram of brightness gradient direction at each of the pixels in the cells. Next, the vortex vein analysis section 2060 takes the gradient direction having the lowest count in the histogram of the cells as the movement direction for the pixels in each of the cells. This gradient direction corresponds to the blood vessel running direction. Note that the reason for taking the gradient direction having the lowest count as the blood vessel running direction is as follows. The brightness gradient is small in the blood vessel running direction, whereas the brightness gradient large in other directions (for example, there is a large difference in brightness between blood vessel and non-blood vessel tissue). Thus creating a histogram of brightness gradient for each of the pixels results in a small count in the blood vessel running direction. The blood vessel running direction at each of the pixels in the choroidal vascular image is set by the processing described above.

The vortex vein analysis section 2060 sets initial positions for M (natural number)×N (natural number) (=L) individual hypothetical particles on the choroidal vascular image. More specifically, the vortex vein analysis section 2060 sets a total of L initial positions at uniform spacings on the choroidal vascular image, with M positions in the vertical direction, and N positions in the horizontal direction.

Figure 10:
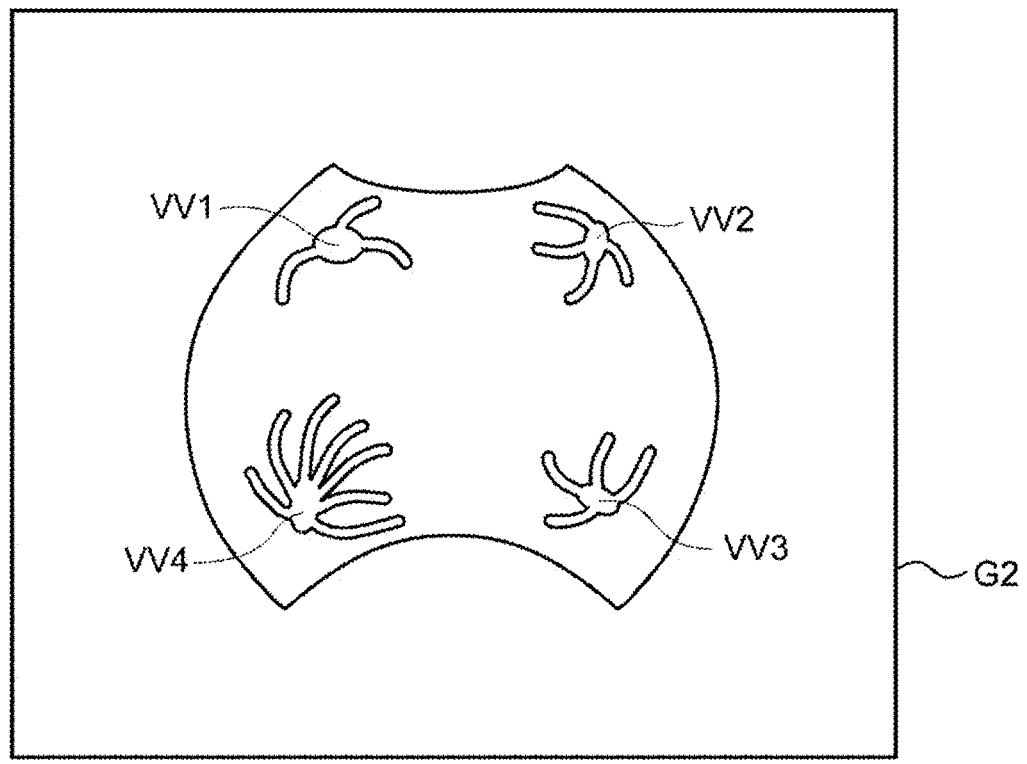
FIG. 10 is a diagram illustrating a detected state of four vortex veins VV1 to VV4.

The vortex vein analysis section 2060 estimates the position of the vortex veins. More specifically, the vortex vein analysis section 2060 performs the following processing for each of the L positions. Namely, the vortex vein analysis section 2060 acquires a blood vessel running direction at an initial position (one of the L positions), moves the hypothetical particle by a specific distance along the acquired blood vessel running direction, then re-acquires the blood vessel running direction at the moved-to position, before then moving the hypothetical particle by the specific distance along this acquired blood vessel running direction. This moving by the specific distance along the blood vessel running direction is repeated for a pre-set number of movement times. The above processing is executed for all the L positions. Points where a fixed number of the hypothetical particles or greater have congregated at this point in time are taken as the position of a vortex vein. A detected state of four vortex veins VV1 to VV4 is illustrated in FIG. 10.

Position information about the vortex veins (number of vortex veins, coordinates on the choroidal vascular image, and the like) are stored in the storage device 254.

At step 606 the vortex vein analysis section 2060 reads the choroidal vascular image G2 and the green fundus image from the storage device 254.

At step 608 the vortex vein analysis section 2060 detects respective positions (coordinates) of the macular and the optic nerve head.

The macular is a dark area of the green fundus image. The vortex vein analysis section 2060 detects as the position of the macular an area of a specific number of pixels having the smallest pixel value in the read green fundus image.

The vortex vein analysis section 2060 detects a position of the optic nerve head in the green fundus image. More specifically, the vortex vein analysis section 2060 performs pattern matching of a predetermined optic nerve head image against the read green fundus image, and detects the optic nerve head in the green fundus image. Moreover, the optic nerve head is the brightest area in the green fundus image, and so an area of a specific number of pixels having the largest pixel value in the read green fundus image may be detected as the position of the optic nerve head.

The choroidal vascular image is produced by processing the red fundus image and the green fundus image in the manner described above. Thus when the coordinate system of the green fundus image is overlaid on the coordinate system of the choroidal vascular image, the respective positions in the coordinate system of the green fundus image are the same as the respective positions in the coordinate system of the choroidal vascular image. The respective positions on the choroidal vascular image corresponding to the respective positions of the macular and the optic nerve head detected in the green fundus image are therefore the respective positions of the macular and the optic nerve head.

Thus in the processing of step 608, the position of the macular may be detected from the choroidal vascular image instead of from the green fundus image. Similarly, in the processing of step 608, the position of the optic nerve head may be detected from the choroidal fundus image instead of from the green fundus image.

At step 610, the vortex vein analysis section 2060 computes the relative positions of each of the detected vortex veins (the positional relationships between the vortex veins and a fundus structure such as the macular and optic nerve head).

Figure 14A:
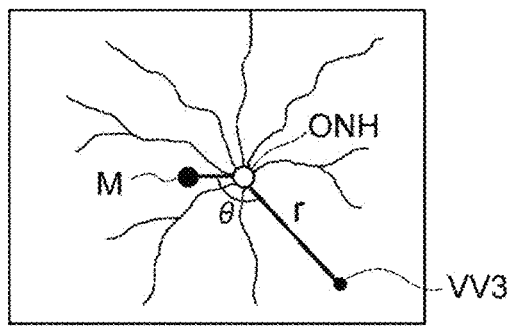
FIG. 14A is a diagram in which the position of a vortex vein is identified by an angle θ and a distance r with respect to the optic nerve head ONH.
Figure 15A:
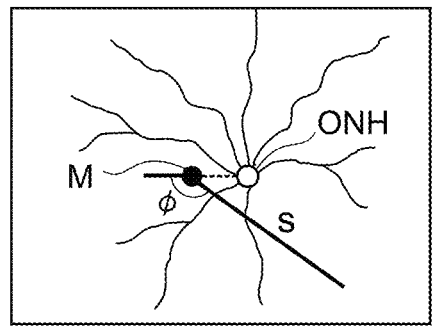
FIG. 15A is a diagram in which a vortex vein position is are identified by an angle φ and a distance s with respect to a macular M.

The vortex vein VV3, as illustrated in FIG. 14A, has a positional relationship of a formed angle θ between a first line connecting the optic nerve head ONH and the macular M together and a second line connecting the optic nerve head ONH and the vortex vein (e.g. VV3) together, and a distance r between the vortex vein VV3 and the optic nerve head ONH. In step 610 the vortex vein analysis section 2060 computes this positional relationship. The vortex vein VV3, as illustrated in FIG. 15A, also has a positional relationship of a formed angle φ between the first line connecting the optic nerve head ONH and the macular M together and a third line connecting the first line, the macular M, and the vortex vein VV3 together, and a distance s between the vortex vein and the macular. Such computation of positional relationships is performed for all of the detected vortex veins.

The pair of the angle θ and the distance r, and the pair of the angle φ and the distance s, are examples of the "first pair" and the "second pair" of the technology disclosed herein.

The vortex vein analysis section 2060 calculates the angle θ, the distance r, the angle φ, and the distance s for each of the vortex veins. Note that the method of calculating the angle φ and the distance s differs from the method of calculating the angle θ and the distance r in that the macular M is employed as a reference instead of the optic nerve head ONH, and is otherwise substantially similar. Hereafter follows an explanation of the method of calculating the angle θ and the distance r, and explanation of the method of calculating the angle φ and the distance s will be omitted.

Figure 7A:
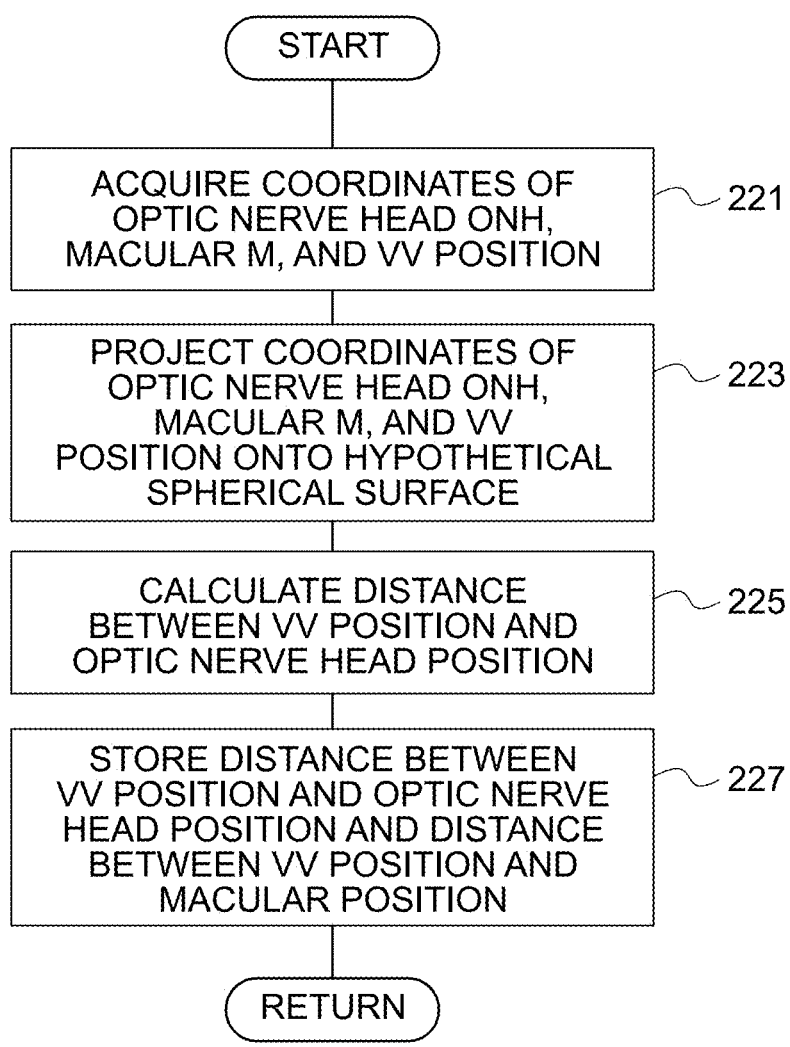
FIG. 7A is a flowchart of processing to calculate a distance r between a vortex vein and the optic nerve head ONH in relative position computation processing of vortex veins of step 506 of FIG. 5.

First, explanation follows regarding a method of calculating the distance (hereafter referred to as the VV distance) between the vortex vein (hereafter referred to as VV) and the optic nerve head ONH, with reference to FIG. 7A.

At step 221 the vortex vein analysis section 2060 acquires the respective coordinates of the optic nerve head ONH, the macular M, and the VV position on the choroidal fundus image.

Figure 13:
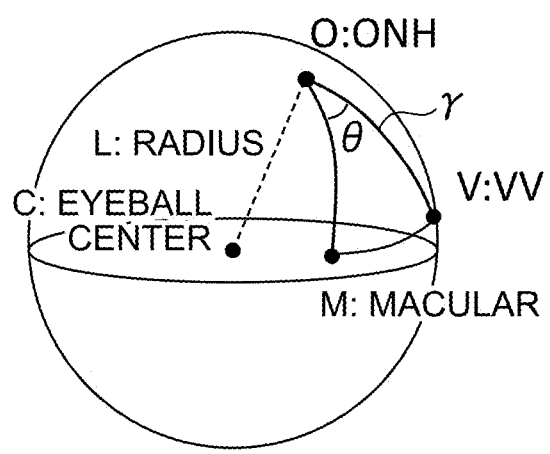
FIG. 13 is a diagram illustrating a hypothetical sphere surface.

Next at step 223, the vortex vein analysis section 2060 projects the respective coordinates of the optic nerve head ONH, the macular M, and the VV position onto a hypothetical spherical surface illustrated in FIG. 13. The hypothetical spherical surface illustrated in FIG. 13 is a spherical surface with C at the center of the eyeball, and a radius of L (an eye axial length of 2L). On the spherical surface the position of the VV is projected at V, the position of the optic nerve head ONH at O, and the position of the macular at M.

Taking this hypothetical spherical surface as an eyeball model, then at step 225 the vortex vein analysis section 2060 calculates a great circle distance between two points on the spherical surface as VV distance r. Namely, a great circle is defined as a section arising from cutting the sphere so as to pass through the sphere center C, and a great circle distance is defined as the length of an arc on the great circle connecting two points (the VV position: V and the optic nerve head position: O) for which the distance is measured on the spherical surface. When the latitude and longitude on the hypothetical spherical surface of the VV position V are expressed as (latitude θ1, longitude φ1) and the latitude and longitude of the optic nerve head position O are expressed as (latitude θ2, longitude φ2), then at the present step 223, the vortex vein analysis section 2060 calculates the VV distance between the VV position and the optic nerve head position, namely, the great circle distance OV, using spherical trigonometry.

$$R \cos^{-1}(\cos\theta_1 \cos\theta_2 \cos(\varphi_1-\varphi_2)+\sin\theta_1 \sin\theta_2) \quad \text{Equation 1}$$

At step 227, the vortex vein analysis section 2060 stores the computed VV distance r, namely the VV distance r between the VV position and the optic nerve head position (great circle distance OV) in the storage device 254.

When the processing illustrated in FIG. 7A has been completed, the relative position computation processing proceeds to the angle θ (hereafter referred to as VV angle) computation processing of FIG. 7B.

Figure 11:
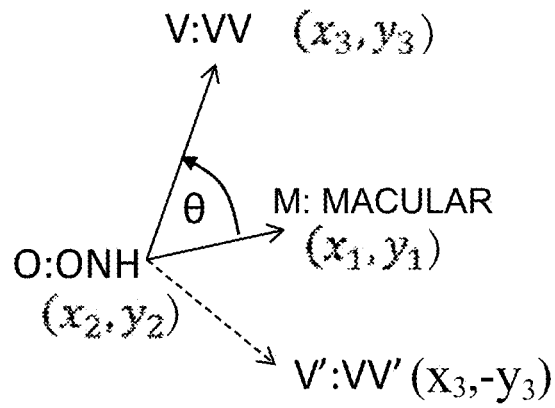
FIG. 11 is a diagram illustrating a macular M position—optic nerve head ONH position—VV position.

As illustrated in FIG. 11 and FIG. 14A, the VV angle is an angle θ turned through when traveling from the macular M position to the optic nerve head ONH position and on toward the VV position.

The method for computing the angle θ turned through when traveling from the macular M position to the optic nerve head ONH position and on toward the VV position may be by the following method of computation by conformal projection or by a method of computation by spherical trigonometry.

First description follows regarding a method of computation of angle θ by conformal projection, with reference to FIG. 7B.

In a normal method of computation from an inner product, there is no discrimination between positive and negative computed angles, and it is not possible to discriminate between a VV on the upper hemisphere (($x_3$, $y_3$) in FIG. 11), and a VV' on the lower hemisphere ($x_3$, $-y_3$). Moreover, in a method employing an arctan function, although there is a discrimination made between positive and negative, since the computation direction of θ is always fixed (for example, counterclockwise), the values in the upper and lower hemispheres are reversed in the left and right eyes with reference to anatomical features (nose side/ear side). To address this matter, in the present exemplary embodiment a left-right eye adjustment sign $f_{sign}$ is employed so as to adjust the computed angle to positive or negative.

At step 222 of FIG. 7B, the vortex vein analysis section 2060 computes the left-right eye adjustment sign $f_{sign}$. As illustrated in FIG. 11, the macular M position is ($x_1$, $y_1$), the optic nerve head ONH position is ($x_2$, $y_2$), and the VV position is ($x_3$, $y_3$).

The left-right eye adjustment sign $f_{sign}$ is set as:

$f_{sign}=+1$ (in cases in which $x_1>x_2$)

$f_{sign}=-1$ (in cases in which $x_1<x_2$)

This approach is adopted since it is possible to determine anatomically from the positions of the macular and the optic nerve head that this is the left eye when $x_1>x_2$ and this is the right eye when $x_1<x_2$. Moreover, were there to be a case in which $x_1=x_2$, then in this case $f_{sign}=+1$.

At step 224, the vortex vein analysis section 2060 computes cos θ and sin θ based on the definitions of an inner product and cross product of vectors using Equation 2 and Equation 3. The angle θ turned through when traveling from the macular M position to the optic nerve head ONH position and on toward the VV position is an angle formed between a vector OM (the vector connecting the optic nerve head position O and the macula position M) and a vector OV (the vector connecting the optic nerve head position O to the vortex vein position V).

$$\cos\theta = \frac{\overrightarrow{OM}\cdot\overrightarrow{OV}}{|OM||OV|} \quad \text{Equation 2}$$

$$\sin\theta = \frac{(x_1-x_2)(y_3-y_2)-(x_3-x_2)(y_1-y_2)}{|OM||OV|} \quad \text{Equation 3}$$

Figure 12:
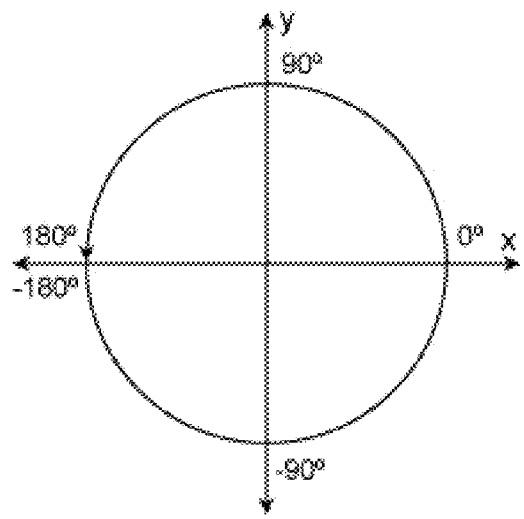
FIG. 12 is a diagram illustrating a sign of x in each of four quadrants.

At step 226, the vortex vein analysis section 2060 computes θ using in the following manner using a four quadrant arctan function.

$$\theta = a\tan 2(\sin\theta, \cos\theta) \quad \text{Equation 4}$$

θ found from the four quadrant arctan function does not only factor in the value of y/x, but, as illustrated in FIG. 12, also considers the sign of x in the respective four quadrants.

At step 228, the vortex vein analysis section 2060 performs left-right eye adjustment on the sign of the computed θ using the sign $f_{sign}$ in the following manner. At step 230, the vortex vein analysis section 2060 stores the value of θ found in this manner as the VV angle in the storage device 254.

$$\theta = \theta \cdot f_{sign} \quad \text{Equation 5}$$

Next, description follows regarding the method of computing the angle θ using spherical trigonometry.

As illustrated in FIG. 13, the macula position M, the optic nerve head ONH position O, and the VV position V are positions on the surface of a sphere having the eyeball center C at the center, and having a radius L wherein the eye axial length is 2L. An angle, denoted a, at the apex O of a triangle OMV having apexes of the macula position M, the optic nerve head ONH position O, and the VV position V can be computed from:

$$\cos\alpha = \frac{\left(\overrightarrow{CO}\times\overrightarrow{CM}\right)\cdot\left(\overrightarrow{CO}\times\overrightarrow{CV}\right)}{\left|\overrightarrow{CO}\times\overrightarrow{CM}\right|\left|\overrightarrow{CO}\times\overrightarrow{CV}\right|} \quad \text{Equation 6}$$

$$\sin\alpha = \frac{\left|\left(\overrightarrow{CO}\times\overrightarrow{CM}\right)\times\left(\overrightarrow{CO}\times\overrightarrow{CV}\right)\right|}{\left|\overrightarrow{CO}\times\overrightarrow{CM}\right|\left|\overrightarrow{CO}\times\overrightarrow{CV}\right|} \quad \text{Equation 7}$$

(wherein α lies in a range [0, π]).

As θ changes (in the range of open interval [−π, π], the value of α is computed by θ=α·$g_{sign}$, wherein $g_{sign}$ (positional relationship between macular M and optic nerve head ONH, positional relationship between VV position V and macular M)={1, −1}. The value of θ found in this manner is stored as the VV angle in the storage device 254.

The image processing program includes one or other of a program to compute the VV angle from the conformal projection illustrated in FIG. 7B, or a program to compute using spherical trigonometry as described above.

When the computation processing illustrated in FIG. 7B has finished, the vortex veins analysis processing of FIG. 6 (step 506 of FIG. 5) is ended, and image processing proceeds to step 508.

At step 508, the processing section 208 reads data related to past images corresponding to the patient ID. The data related to past images corresponding to the patient ID includes relative positions of vortex veins based on past UWF fundus images corresponding to the patient ID.

The data related to past images is stored data from the image processing of FIG. 5 being executed in the past at a different timing to the current timing.

The relative position of a vortex vein based on the current UWF fundus image obtained by this current time of executing the image processing of FIG. 5, and the relative position of the vortex vein based on a past image obtained by executing the image processing of FIG. 5 in the past, are examples of a "first position" and a "second position" of technology disclosed herein.

Note that the "first position" and the "second position" of technology disclosed herein are not limited to the above relative positions, and may be identified by coordinates of the position of the vortex vein.

At step 510 the comparison image generation section 2062 generates vortex vein map data.

The vortex vein map referred to here is a map obtained by plotting the positions of vortex veins extracted from plural fundus images that were imaged at different timings (dates and times). By plotting a map of these positions of vortex veins extracted from plural fundus images that were imaged at different timing in this manner, an ophthalmologist or the like is able, by looking at the map, to compare the relative position of the vortex vein based on the newly imaged UWF fundus image against the relative position of the vortex vein based on a past UWF fundus image.

The relative position of the vortex vein based on the current UWF fundus image is a relative position of the vortex vein based on the UWF fundus image acquired the current time by the current execution of the image processing. The relative position of the vortex vein based on the past UWF fundus image is a relative position of the vortex vein based on the past UWF fundus image corresponding to the patient ID that was read at step 508.

Thus in this manner the relative position of the vortex vein is identified from the angle θ and distance r with respect to the optic nerve head ONH as illustrated in FIG. 14A, and from the angle φ and the distance s with respect to the macular M as illustrated in FIG. 15A.

There are plural respective maps for the vortex vein map employing the angle θ and the distance r and the vortex vein map employing the angle φ and the distance s.

Figure 14B:
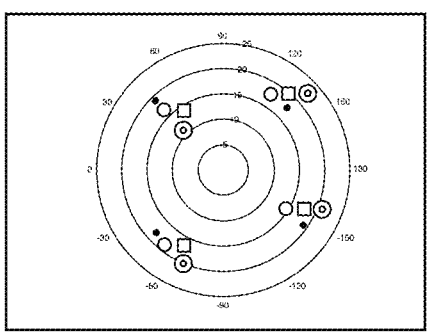
FIG. 14B is a diagram illustrating vortex vein positions on a map (radar chart) displayed in a polar coordinate system using the angle θ and the distance r.
Figure 14C:
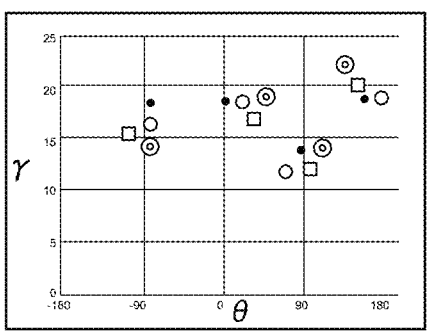
FIG. 14C is a diagram illustrating vortex vein positions on a map displayed in a two dimensional orthogonal coordinate system using the angle θ and the distance r.

For example, the vortex vein map employing the angle θ and the distance r may firstly be a map (radar chart) in which the current and past vortex vein positions are displayed in a polar coordinate system employing the angle θ and the distance r as illustrated in FIG. 14B. The vortex vein map may secondly be a map in which the current and past vortex vein positions are displayed in a two-dimensional orthogonal coordinate system employing the angle θ and the distance r as illustrated in FIG. 14C. The vortex vein map may thirdly be a map in which the current and past vortex vein positions are displayed in a three-dimensional orthogonal coordinate system employing the angle θ and the distance r as illustrated in FIG. 14D.

Figure 14D:
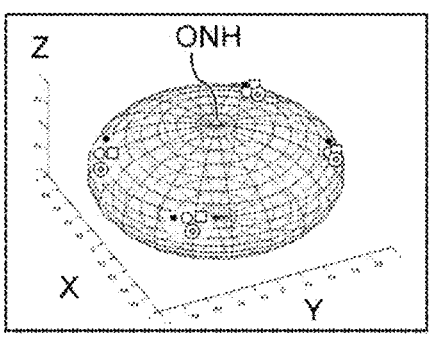
FIG. 14D is a diagram illustrating vortex vein positions on a map displayed in a three dimensional orthogonal coordinate system using the angle θ and the distance r.

The map displayed in the two-dimensional orthogonal coordinate system illustrated in FIG. 14C is an example of a "scatter diagram defined by two-dimensional orthogonal axes" of technology disclosed herein, and the map displayed in the three-dimensional orthogonal coordinate system illustrated in FIG. 14D is an example of a "scatter diagram defined by three-dimensional orthogonal axes" of technology disclosed herein.

The comparison image generation section 2062 generates data for each of the maps from FIG. 14B to FIG. 14D in the following manner.

The respective maps from FIG. 14B to FIG. 14D are generated by plotting the relative position of the vortex veins based on the current UWF fundus image as "·", and are created by plotting the relative position of the vortex vein based on the UWF fundus images obtained by fundus imaging the past three times as "○", "□", and "⊙".

In the map of the three-dimensional orthogonal coordinate system illustrated in FIG. 14D, the eyeball center is a center (0.0.0) in three dimensions (X, Y, Z), with an apex point (0.0.1) at the position of the optic nerve head ONH. In the map in the three-dimensional orthogonal coordinate system, the position of the vortex vein identified by the angle θ and the distance r is plotted at a position corresponding to the angle θ and the distance r in the eyeball model. The eyeball model has a size that is adjusted according to the eye axial length.

The examples of each of the maps illustrated in FIG. 14B to FIG. 14D indicate that the position is changing for the vortex veins of the patient identified by the patient ID.

Figure 15B:
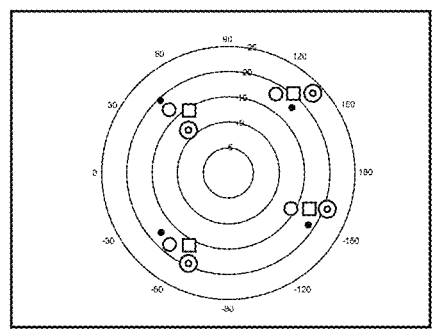
FIG. 15B is a diagram illustrating vortex vein positions on a map (radar chart) displayed in a polar coordinate system using the angle φ and the distance s.
Figure 15C:
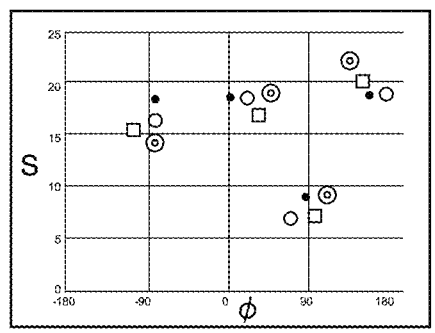
FIG. 15C is a diagram illustrating vortex vein positions on a map displayed in a two dimensional orthogonal coordinate system using the angle φ and the distance s.
Figure 15D:
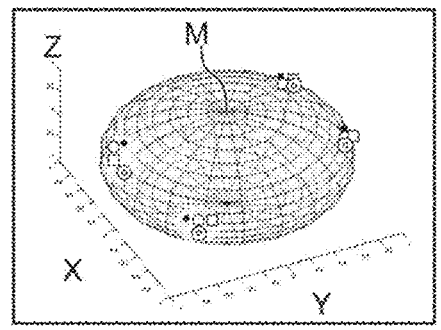
FIG. 15D is a diagram illustrating vortex vein positions on a map displayed in a three dimensional orthogonal coordinate system using the angle φ and the distance s.

Vortex vein maps of employing the angle (p and the distance s are illustrated in FIG. 15B to FIG. 15D. The respective maps from FIG. 15B to FIG. 15D correspond to the respective maps from FIG. 14B to FIG. 14D, and so explanation thereof will be omitted.

At step 512 the processing section 208 saves the UWF fundus image, the choroidal fundus image, and the positions of each of the vortex veins (angle θ, distance r, angle (p, and distance s), and the data for each map in the storage device 254 associated with the patient ID.

The image processing of FIG. 5 is executed by the server 140 each time a patient ID and UWF fundus image is received from the ophthalmic device 110. The technology disclosed herein is not limited thereto and, for example, image processing may be executed in cases in which an operator has input a patient ID and operated a start button. There are sometimes situations in which, even when the server 140 receives a UWF fundus image from the ophthalmic device 110, a UWF fundus image is present for which the vortex vein relative positions have not been computed.

In such cases, a first approach is for, at step 502, the processing section 208 to acquire from the storage device 254 a UWF fundus image G1 for which the vortex vein relative positions have not been computed. Step 504 and step 506 are executed for each of the acquired UWF fundus images G1 in cases in which plural UWF fundus images G1 have been acquired for which the vortex vein relative positions have not been computed.

A second approach is to execute step 504 and step 506 for all of the UWF fundus images G1 corresponding to the patient ID, whether or not the vortex vein relative positions have been computed.

An ophthalmologist inputs the patient ID into the viewer 150 when examining the examined eye of the patient. The viewer 150 instructs the server 140 to transmit various data corresponding to the patient ID. The server 140 transmits the patient name, patient age, patient visual acuity, left eye/right eye information, eye axial length, imaging date, and various data corresponding to the patient ID to the viewer 150 together with the patient ID. The various data includes the above UWF fundus image, the choroidal fundus image, each of the vortex vein positions (angle θ, distance r, angle φ, and distance s) and data of a screen for each map.

Figure 16:
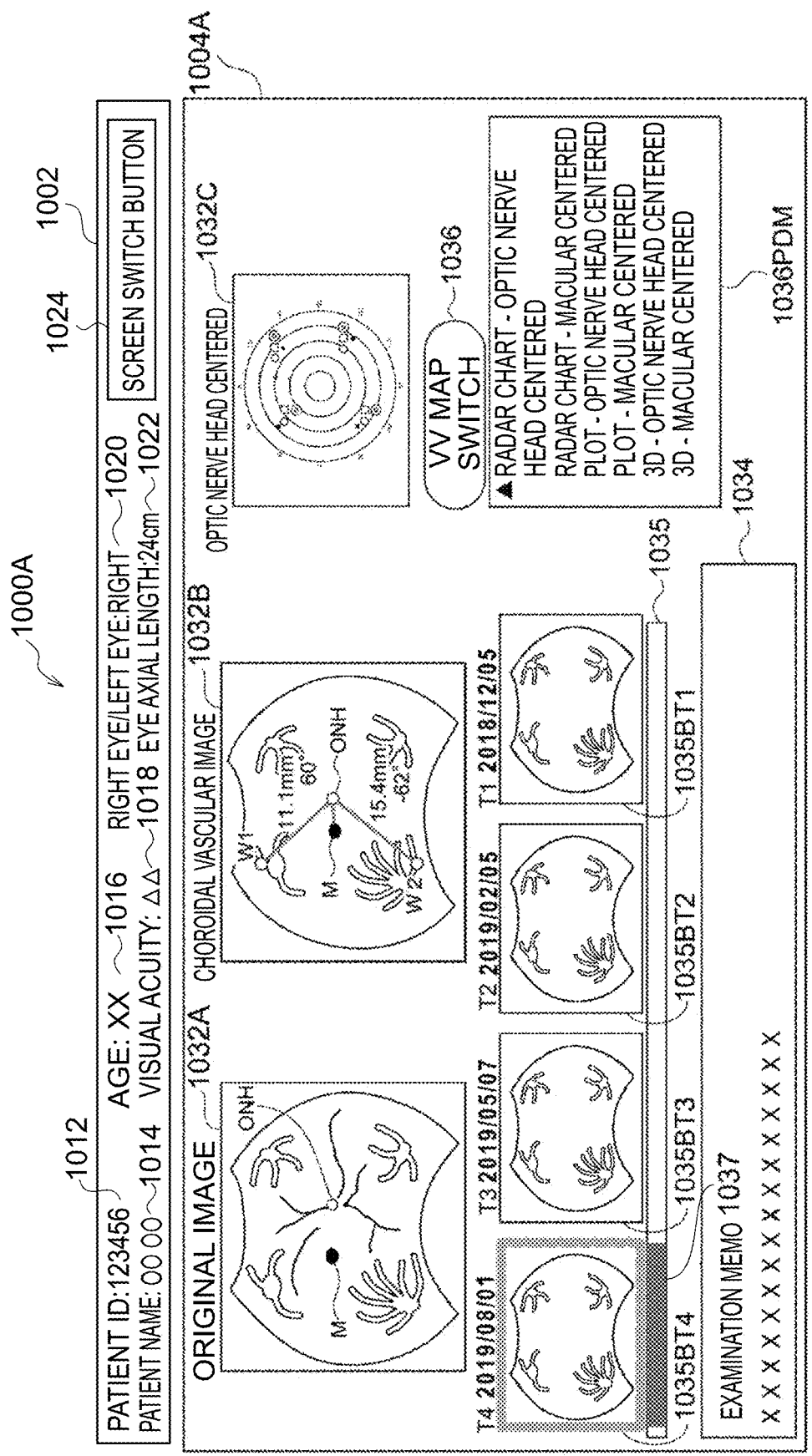
FIG. 16 is a diagram illustrating a first fundus image display screen 1000A.

On receiving the patient ID, patient name, patient age, patient visual acuity, left eye/right eye information, eye axial length, imaging date, and various data, the viewer 150 displays the first fundus image display screen 1000A illustrated in FIG. 16 on a display.

As illustrated in FIG. 16, the first fundus image display screen 1000A includes a patient information display field 1002 and a first fundus image information display field 1004A.

The first fundus image information display field 1004A is an example of a "display view" of technology disclosed herein.

The patient information display field 1002 is for displaying the patient ID, the patient name, the patient age, the visual acuity of the patient, left eye/right eye information, and eye axial length, and includes display fields from 1012 to 1022 and a screen switch button 1024. The received patient ID, patient name, patient age, patient visual acuity, left eye/right eye information, and eye axial length are displayed in the display fields from 1012 to 1022.

The first fundus image information display field 1004A includes a UWF fundus image display field 1032A, a choroidal vascular image display field 1032B, and current/past choroidal vascular image display fields 1035BT4 to 1035BT1, a slider 1037, and a slider bar 1035. The first fundus image information display field 1004A also includes a vortex vein map display field 1032C, a VV map switching button 1036, and an information display field 1034.

Data about the imaging date and time (YYY/MM/DD) of imaging the fundus is displayed in the choroidal vascular image display fields 1035BT4 to 1035BT1.

The UWF fundus image and the choroidal vascular image obtained by imaging the fundus at the closest time to the current time are initially displayed in the UWF fundus image display field 1032A and the choroidal vascular image display field 1032B. The UWF fundus image, namely the original fundus image, is an RGB color fundus image, for example.

When the ophthalmologist moves the slider 1037, the UWF fundus image and the choroidal vascular image that were obtained by imaging the fundus at the imaging date and time for the position of the slider 1037 are displayed in the UWF fundus image display field 1032A and the choroidal vascular image display field 1032B.

The vortex vein map is displayed in the vortex vein map display field 1032C. More specifically, when the VV map switching button 1036 is operated, a pull down menu 1036PDM is displayed for selecting the vortex vein map (FIG. 14B to FIG. 14D and FIG. 15B to FIG. 15D).

There are six items included in the pull down menu 1036PDM: "radar chart centered on optic nerve head", "radar chart centered on macular", "plot centered on optic nerve head", "plot centered on macular", "3D centered on optic nerve head", and "3D centered on macular".

When the "radar chart centered on optic nerve head" is selected, this selects display of a map (radar chart) displayed by a coordinate system employing the angle θ and the distance r with respect to the optic nerve head ONH, as illustrated in FIG. 14B.

When the "radar chart centered on macular" is selected, this selects display of a map (radar chart) displayed by a coordinate system employing the angle φ and the distance s with reference to the macular M, as illustrated in FIG. 15B.

When the "plot centered on optic nerve head" is selected, this selects display of a map displayed by a two-dimensional orthogonal coordinate system employing the angle θ and the distance r, as illustrated in FIG. 14C.

When the "plot centered on macular" is selected, this selects display of a map displayed by a two-dimensional orthogonal coordinate system employing the angle φ and the distance s, as illustrated in FIG. 15C.

When "3D centered on optic nerve head" is selected, this selects display of a map displayed by a three-dimensional orthogonal coordinate system employing the angle θ and the distance r, as illustrated in FIG. 14D.

When "3D centered on macular" is selected, this selects display of a map displayed by a three-dimensional orthogonal coordinate system employing the angle φ and the distance r, as illustrated in FIG. 15D.

For example, in cases in which the radar chart having the optic nerve head at the center ("radar chart centered on optic nerve head" item) has been selected from the pull down menu 1036PDM, a radar chart having the optic nerve head at the center (see FIG. 14B) that corresponds to the imaging date and time for the position of the slider 1037 is displayed in the vortex vein map display field 1032C.

When an item on the pull down menu 1036PDM is selected, the corresponding vortex vein map is displayed, and relative positions of all of the plural vortex veins (four in the example above) are displayed on the vortex vein map being displayed. The technology disclosed herein is not limited thereto. The relative position of one vortex vein selected from out of plural vortex veins may be displayed on the vortex vein map. For example, as illustrated in the example of FIG. 16, for example, the ophthalmologist selects one vortex vein from out of the four vortex veins being displayed in the UWF fundus image display field 1032A. For example, when the upper left vortex vein is selected, the relative position of the selected vortex vein alone is displayed in the vortex vein map display field 1032C. Note that in the technology disclosed herein, there is no limitation to the ophthalmologist selecting a single vortex vein from out of four vortex veins. For example, for the four vortex veins the viewer 150 may select vortex veins one at a time in a predetermined sequence, for example upper left, upper right, lower right, lower left, with the relative position of the selected vortex vein alone being displayed in the vortex vein map display field 1032C. Or two vortex veins may be selected so as to display the relative positions of the two selected vortex veins. For example, by a user selecting two vortex veins at the upper left and lower left, easy discrimination can be made as to whether the position of the upper left vortex vein and the position of the lower left vortex vein have maintained symmetry with respect to a line segment connecting the macular and the optic nerve head between follow-up observations, or whether the symmetry has collapsed into asymmetry at a given point in time.

Comments and memos during examination by a user (ophthalmologist) are displayed as text in the information display field 1034.

The size of the current/past choroidal vascular image display fields 1035BT4 to 1035BT1 is smaller than the size of the UWF fundus image display field 1032A and the choroidal vascular image display field 1032B.

The size of the vortex vein map display field 1032C is smaller than the size of the UWF fundus image display field 1032A and the choroidal vascular image display field 1032B.

Figure 17:
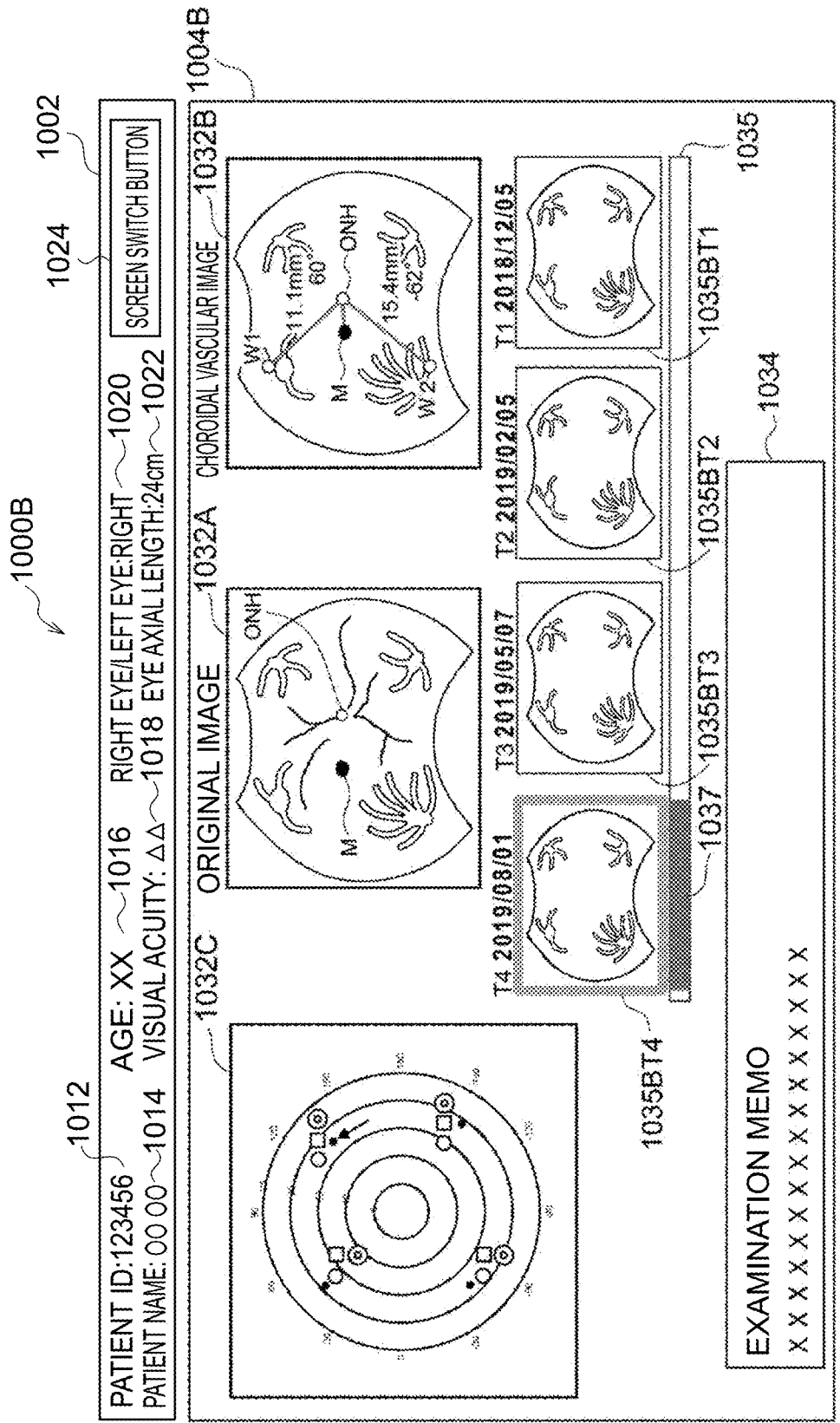
FIG. 17 is a diagram illustrating a second fundus image display screen 1000B.

In cases in which the screen switch button 1024 of FIG. 16 has been operated, the viewer 150 displays the second fundus image display screen 1000B illustrated in FIG. 17 on the display.

The content of the first fundus image display screen 1000A and the second fundus image display screen 1000B is substantially similar, and so the same reference numerals are appended to the same parts, explanation thereof will be omitted, and explanation will focus on the differing parts alone.

The size of the vortex vein map display field 1032C in the fundus image information display field 1004B of the second fundus image display screen 1000B is larger than the size of a vortex vein map display field 1032C of FIG. 16. The position of the vortex vein map display field 1032C of the second fundus image display screen 1000B is different from the position of the vortex vein map display field 1032C of FIG. 16.

When one or other plot is selected by a cursor (black→) on the vortex vein map display field 1032C of FIG. 17, the viewer 150 changes the color of this plot to another color, and also changes the color of the plots at the positions of other vortex veins detected in the same choroidal vascular image to another color. Moreover, the viewer 150 moves the slider 1037 so as to correspond to the imaging date and time corresponding to this plot. In the UWF fundus image display field 1032A and the choroidal vascular image display field 1032B, the viewer 150 displays the UWF fundus image and the choroidal vascular image that were obtained by imaging the fundus at the imaging date and time corresponding to the position of the slider 1037.

Figure 18:
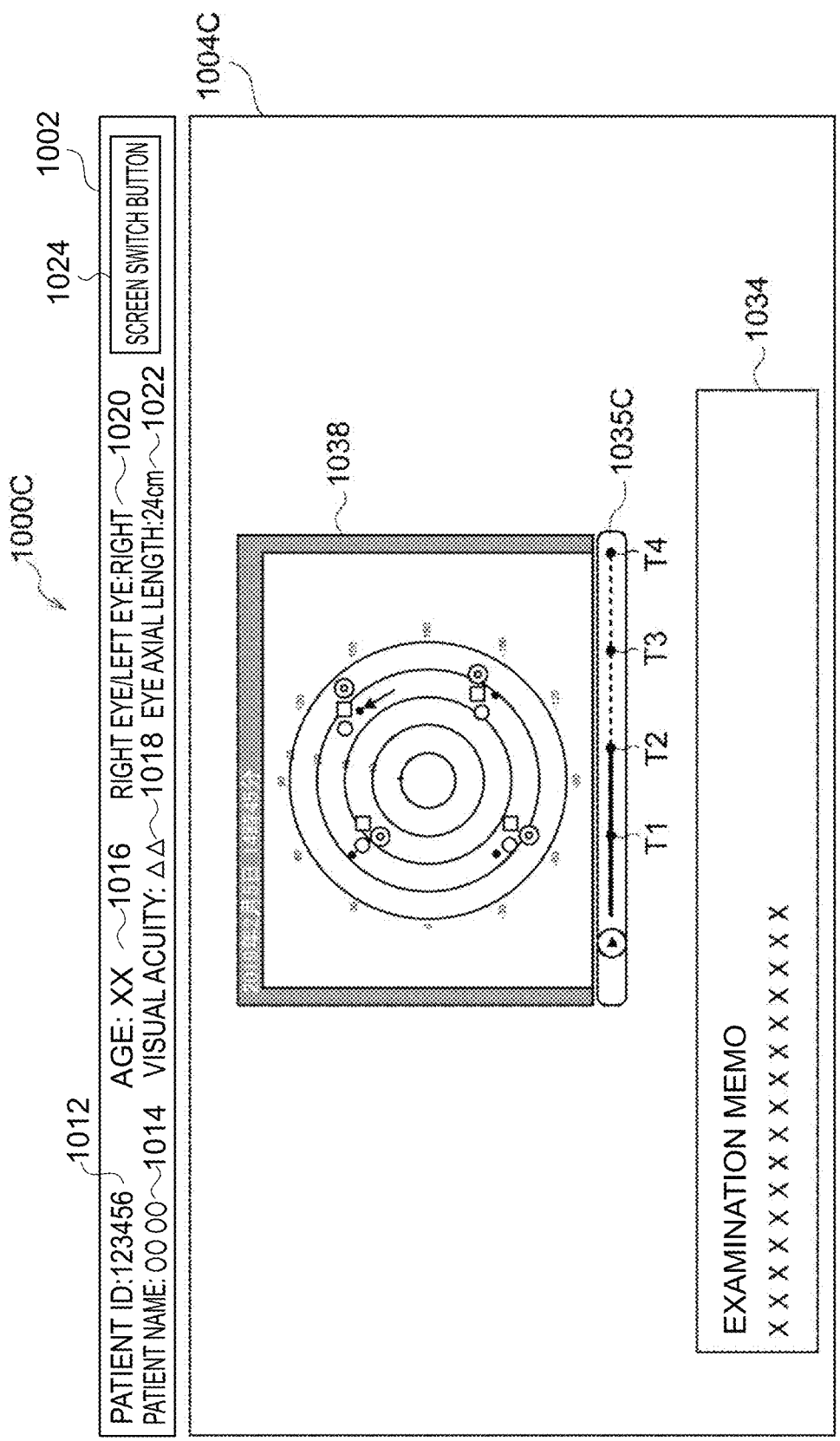
FIG. 18 is a diagram illustrating a third fundus image display screen 1000C.

When the screen switch button 1024 of FIG. 17 has been operated, the viewer 150 displays the third fundus image display screen 1000C illustrated in FIG. 18 on the display.

The content of the second fundus image display screen 1000B and the third fundus image display screen 1000C is substantially similar, and so the same reference numerals are appended to the same parts, explanation thereof will be omitted, and explanation will focus on the differing parts alone.

A third fundus image information display field 1004C of the third fundus image display screen 1000C includes a vortex vein map display field 1038, a color bar 1035C, and an information display field 1034.

For example, a map (FIG. 15C) in which current and past vortex vein positions are displayed in a two-dimensional orthogonal coordinate system centered on the macular is displayed in the vortex vein map display field 1038. When one or other out of the plots (for example "•") is selected by the cursor (black→), the viewer 150 changes the color of this plot to another color, and also changes the color of the plots at the positions of the other vortex veins detected in the same choroidal vascular image to another color. The viewer 150 displays the imaging date and time corresponding to the selected plot ("•" for example) at the top left of the vortex vein map display field 1038. The viewer 150 changes the color of the color bar 1035C from current (left end) to that of the imaging date and time of "•".

As explained above, the present exemplary embodiment displays a comparison map to compare the positions of the vortex veins obtained from each of the current and past fundus images, and is accordingly able to display changes to the position of the vortex veins in an easy to understand manner. This enables follow-up observations to be performed on the vortex vein positions, and enables changes to the vortex vein positions to be displayed in a manner easily understood by a user.

Figure 19:
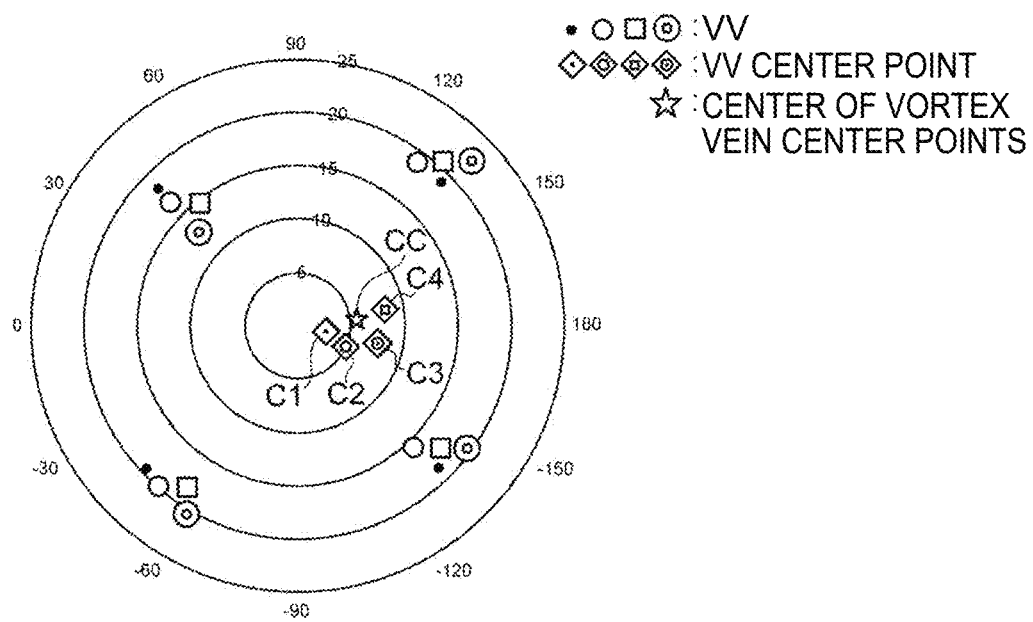
FIG. 19 is a diagram displaying centers C1 to C4 of four positions of vortex veins at each imaging date/time and a center CC of the centers C1 to C4.

The positions of vortex veins alone are plotted in the vortex vein maps displayed in the vortex vein map display field 1032C of FIG. 16 and FIG. 17 and in the vortex vein map display field 1038 of FIG. 18. The technology disclosed herein is not limited thereto, and the viewer 150 may further display the following information. For example, as illustrated in FIG. 19, the viewer 150 firstly displays centers C1 to C4 of the four positions of the vortex vein at each of the imaging dates and times, and secondly displays a center CC of the centers C1 to C4.

Furthermore, the technology disclosed herein may further display a graph to indicate the changes with time in the distances r, s to each of the vortex veins for the respective imaging dates and times.

Moreover, in the exemplary embodiment described above, the position of each of the vortex veins is identified by the pair of the angle θ and the distance r, and the pair of the angle φ and the distance s, however the technology disclosed herein is not limited thereto. For example, correspondence relationships between a position of each of the pixels of the choroidal fundus image and a position in 3D space (X, Y, Z) may be predetermined and saved. The position of the vortex vein in 3D space is then identified from the position of the vortex vein as identified from the choroidal vascular image, and using these correspondence relationships, the angle and distance is calculated from these identified positions of the vortex veins in 3D space.

In the example described above, the image processing of FIG. 5 is executed by the server 140, however the technology disclosed herein is not limited thereto. For example, this processing may be executed by the ophthalmic device 110 or the viewer 150, or a separate other image processing device may be connected to the network 130 and this processing executed by this image processing device.

Although explanation has been given in the exemplary embodiments described above regarding an example in which a computer is employed to implement image processing using a software configuration, the technology disclosed herein is not limited thereto. For example, instead of a software configuration employing a computer, the image processing may be executed solely by a hardware configuration such as a field programmable gate array (FPGA) or an application specific integrated circuit (ASIC). Alternatively, a configuration may be adopted in which some processing out of the image processing is executed by a software configuration, and the remaining processing is executed by a hardware configuration.

Such technology disclosed herein encompasses cases in which the image processing is implemented by a software configuration utilizing a computer, and also image processing implemented by a configuration that is not a software configuration utilizing a computer, and encompasses the following first technology to the third technology.

First Technology

An image processing device including an identification section that identifies a first position of a vortex vein from a first fundus image and identifies a second position of the vortex vein from a second fundus image, and a generation section that generates data of a screen to display the first position and the second position.

Note that the vortex vein analysis section 2060 of the exemplary embodiment described above is an example of the "identification section" of the above first technology, and the comparison image generation section 2062 of the exemplary embodiment described above is an example of the "generation section" of the above first technology.

The following second technology is proposed from the content disclosed above.

Second Technology

An image processing method including an identification section identifying a first position of a vortex vein from a first fundus image and identifying a second position of the vortex vein from a second fundus image, and a generation section generating data of a screen for displaying the first position and the second position.

The following third technology is proposed from the content disclosed above.

Third Technology

A computer program product for image processing, the computer program product including a computer-readable storage medium that is not itself a transitory signal, with a program stored on the computer-readable storage medium, and the program causing a computer to execute processing including identifying a first position of a vortex vein from a first fundus image and identifying a second position of the vortex vein from a second fundus image, and generating data of a screen to display the first position and the second position.

It must be understood that the image processing described above is merely an example thereof. Obviously redundant steps may be omitted, new steps may be added, and the processing sequence may be swapped around within a range not departing from the spirit of the technology disclosed herein.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. An image processing method comprising:
    a processor identifying a first position of a vortex vein from a first fundus image;
    the processor identifying a second position of the vortex vein from a second fundus image; and
    the processor generating data of a vortex vein map to display the first position and the second position,
    wherein the first position and the second position are identified with reference to a first structure of a fundus and a second structure different from the first structure;
    wherein the first position and the second position of the vortex vein are identified by at least one of:
        a first pair of:
            a first formed angle between a first line connecting the first structure of a fundus to the second structure different from the first structure and a second line connecting the first structure to the vortex vein, and
            a first distance between the vortex vein and the first structure; or
        a second pair of:
            a second formed angle between the first line and a third line connecting the second structure to the vortex vein, and
            a second distance between the vortex vein and the second structure.

2. The image processing method of claim 1, wherein the first fundus image and the second fundus image are images capturing a fundus at different timings.

3. The image processing method of claim 1, wherein the vortex vein map is a map in which the first position and the second position of the vortex vein are displayed in at least one coordinate system of:
    a polar coordinate system employing at least one of the first pair or the second pair;
    a two-dimensional orthogonal coordinate system; or
    a three-dimensional orthogonal coordinate system.

4. The image processing method of claim 3, wherein:
    the map displayed in the polar coordinate system is a radar chart;
    the map displayed in the two-dimensional orthogonal coordinate system is a scatter diagram defined by two-dimensional orthogonal axes; and the map displayed in the three-dimensional orthogonal coordinate system is a scatter diagram defined by three-dimensional orthogonal axes.

5. The image processing method of claim 1, wherein:
a plurality of vortex veins is present in each of the first fundus image and the second fundus image;
the processor finds a center position of the plurality of vortex veins; and
the center position is displayed on the vortex vein map.

6. The image processing method of claim 1, wherein:
a plurality of vortex veins is present in each of the first fundus image and the second fundus image; and
data of the vortex vein map is generated for a vortex vein selected from among the plurality of vortex veins.

7. The image processing method of claim 1, further comprising:
the processor generating a display view to display the vortex vein map, the first fundus image and the second fundus image.

8. An image processing device comprising:
a memory; and
a processor coupled to the memory,
wherein the processor:
identifies a first position of a vortex vein from a first fundus image;
identifies a second position of the vortex vein from a second fundus image; and
generates data of a vortex vein map to display the first position and the second position,
wherein the first position and the second position are identified with reference to a first structure of a fundus and a second structure different from the first structure;
wherein the first position and the second position of the vortex vein are identified by at least one of:
a first pair of:
a first formed angle between a first line connecting the first structure of a fundus to the second structure different from the first structure and a second line connecting the first structure to the vortex vein, and
a first distance between the vortex vein and the first structure; or
a second pair of:
a second formed angle between the first line and a third line connecting the second structure to the vortex vein, and
a second distance between the vortex vein and the second structure.

9. A non-transitory storage medium storing a program executable by a computer to perform image processing comprising:
identifying a first position of a vortex vein from a first fundus image;
identifying a second position of the vortex vein from a second fundus image; and
generating data of a vortex vein map to display the first position and the second position,
wherein the first position and the second position are identified with reference to a first structure of a fundus and a second structure different from the first structure;
wherein the first position and the second position of the vortex vein are identified by at least one of:
a first pair of:
a first formed angle between a first line connecting the first structure of a fundus to the second structure different from the first structure and a second line connecting the first structure to the vortex vein, and
a first distance between the vortex vein and the first structure; or
a second pair of:
a second formed angle between the first line and a third line connecting the second structure to the vortex vein, and
a second distance between the vortex vein and the second structure.

\* \* \* \* \*